(12) United States Patent
Okazaki

(10) Patent No.: US 9,346,163 B2
(45) Date of Patent: May 24, 2016

(54) ROBOT, ROBOT CONTROL DEVICE, ROBOT CONTROL METHOD, AND ROBOT CONTROL PROGRAM

(71) Applicant: Panasonic Corporation, Osaka (JP)

(72) Inventor: Yasunao Okazaki, Shiga (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 7 days.

(21) Appl. No.: 14/146,215

(22) Filed: Jan. 2, 2014

(65) Prior Publication Data

US 2014/0114479 A1    Apr. 24, 2014

Related U.S. Application Data

(63) Continuation of application No. PCT/JP2012/007183, filed on Nov. 8, 2012.

(30) Foreign Application Priority Data

Nov. 10, 2011  (JP) ................... 2011-246217

(51) Int. Cl.
*B25J 9/00* (2006.01)
*B25J 9/16* (2006.01)
*B25J 13/08* (2006.01)

(52) U.S. Cl.
CPC .............. *B25J 9/1651* (2013.01); *B25J 13/085* (2013.01); *G05B 2219/37002* (2013.01); *G05B 2219/40202* (2013.01); *G05B 2219/41021* (2013.01)

(58) Field of Classification Search
CPC combination set(s) only.
See application file for complete search history.

(56) References Cited

U.S. PATENT DOCUMENTS

| 4,826,392 A * | 5/1989 | Hayati ................... B25J 9/0084 318/625 |
| 5,101,472 A * | 3/1992 | Repperger ............... B25J 9/163 700/261 |

(Continued)

FOREIGN PATENT DOCUMENTS

| JP | 63-8912 | 1/1988 |
| JP | 3-117580 | 5/1991 |

(Continued)

OTHER PUBLICATIONS

International Search Report (ISR) issued Feb. 19, 2013 in International (PCT) Application No. PCT/JP2012/007183.

(Continued)

*Primary Examiner* — Jonathan L Sample
(74) *Attorney, Agent, or Firm* — Wenderoth, Lind & Ponack, L.L.P.

(57) ABSTRACT

A robot having joints includes a position information acquiring section that acquires time series information about a robot position, speed information, or acceleration information, a dynamics parameter switching section that switches a gravity term component and an inertia force term component of a motion equation separately between dynamics parameters including dynamics parameter of the robot gripping no object and dynamics parameter including the object gripped by the robot which robot arm gripping the object, and a desired torque calculation section that outputs a desired robot joint torque value as a desired joint torque based on the motion equation after the dynamics parameter switching section switches the dynamics parameters and the time series information about the robot position, the speed information, or the acceleration information acquired by the position information acquiring section. The robot controls an operation of the robot based on an output from the desired torque calculation section.

12 Claims, 15 Drawing Sheets

(56) References Cited

U.S. PATENT DOCUMENTS

| | | | | |
|---|---|---|---|---|
| 5,994,864 | A * | 11/1999 | Inoue | B25J 9/1633 318/568.2 |
| 8,428,781 | B2 * | 4/2013 | Chang | B25J 9/162 104/53 |
| 8,924,021 | B2 * | 12/2014 | Dariush | G06N 3/008 700/245 |
| 2003/0108415 | A1 * | 6/2003 | Hosek | B25J 9/1664 414/783 |
| 2003/0220714 | A1 * | 11/2003 | Nakamura | B25J 9/1633 700/245 |
| 2004/0103740 | A1 * | 6/2004 | Townsend | B25J 9/1612 74/490.01 |
| 2004/0167641 | A1 * | 8/2004 | Kawai | A61B 5/1038 700/63 |
| 2005/0166413 | A1 * | 8/2005 | Crampton | B25J 13/088 33/503 |
| 2006/0207419 | A1 * | 9/2006 | Okazaki | B25J 9/142 91/35 |
| 2006/0250101 | A1 * | 11/2006 | Khatib | B25J 9/1633 318/568.2 |
| 2007/0021870 | A1 * | 1/2007 | Nagasaka | B25J 13/084 700/245 |
| 2007/0151389 | A1 * | 7/2007 | Prisco | A61B 19/22 74/490.05 |
| 2007/0200525 | A1 * | 8/2007 | Kanaoka | G05D 1/0875 318/568.21 |
| 2007/0255454 | A1 * | 11/2007 | Dariush | G06N 3/008 700/245 |
| 2008/0140257 | A1 * | 6/2008 | Sato | B25J 9/1633 700/258 |
| 2009/0272585 | A1 * | 11/2009 | Nagasaka | B25J 9/1633 180/8.6 |
| 2010/0152896 | A1 * | 6/2010 | Komatsu | B25J 9/0003 700/258 |
| 2010/0152899 | A1 * | 6/2010 | Chang | B25J 9/162 700/262 |
| 2011/0060460 | A1 * | 3/2011 | Oga | B25J 9/1633 700/254 |
| 2011/0067479 | A1 * | 3/2011 | Davis | B25J 9/1692 73/1.75 |
| 2011/0160906 | A1 * | 6/2011 | Orita | B62D 57/032 700/260 |
| 2011/0160907 | A1 * | 6/2011 | Orita | B25J 9/1607 700/260 |
| 2011/0178636 | A1 * | 7/2011 | Kwon | B62D 57/032 700/253 |
| 2011/0218676 | A1 * | 9/2011 | Okazaki | B25J 9/1075 700/260 |
| 2011/0224827 | A1 * | 9/2011 | Andoh | B62D 57/032 700/258 |
| 2013/0000480 | A1 * | 1/2013 | Komatsu | B25J 9/1615 92/48 |

FOREIGN PATENT DOCUMENTS

| | | |
|---|---|---|
| JP | 4-195503 | 7/1992 |
| JP | 2006-119958 | 5/2006 |

OTHER PUBLICATIONS

International Preliminary Report on Patentability issued May 13, 2014 in International (PCT) Application No. PCT/JP2012/007183 (in English).

* cited by examiner

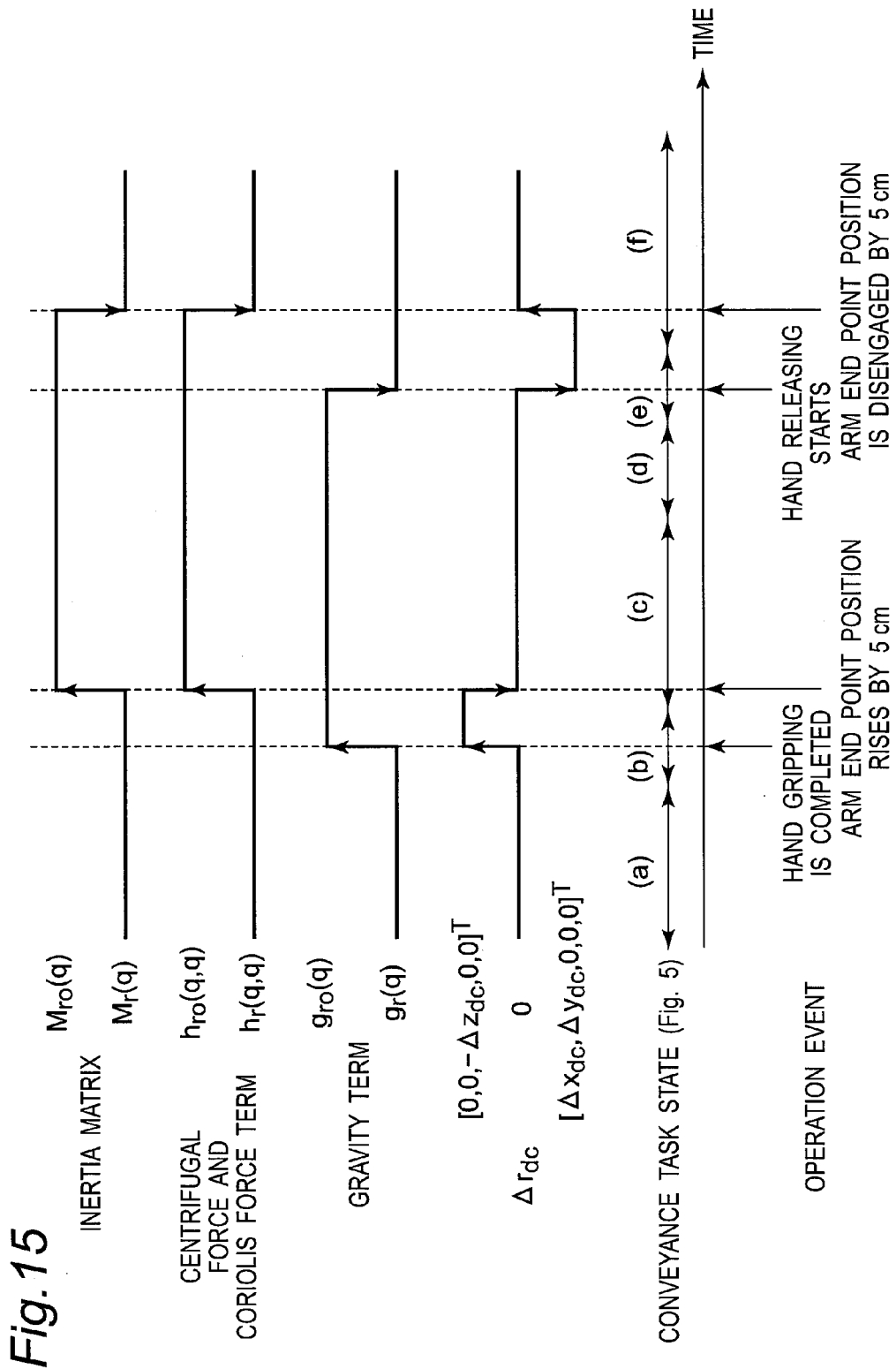

ROBOT, ROBOT CONTROL DEVICE, ROBOT CONTROL METHOD, AND ROBOT CONTROL PROGRAM

CROSS-REFERENCE TO RELATED APPLICATIONS

This is a continuation application of International Application No. PCT/JP2012/007183, with an international filing date of Nov. 8, 2012, which claims priority of Japanese Patent Application No.: 2011-246217 filed on Nov. 10, 2011, the content of which is incorporated herein by reference.

TECHNICAL FIELD

The technical field relates to a robot for controlling an object conveyance operation, a robot control device, a robot control method, and a robot control program.

BACKGROUND ART

In recent years, domestic robots such as nursing-care robots or housework supporting robots are being actively developed. Further, as to industrial robots, robots that cooperate with persons are being actively developed due to spread of cell production plant or the like. Since such robots that cooperate with persons should live together with persons differently from conventional robots that operate in robot task areas separated from human areas, such robots requires safety that is different from the conventional industrial robots.

Further, as to robot arms as one example of robots, an output torque of each joint is calculated based on conveying objects, their self-mass, and inertia moments. Since the torque required by each joint changes between when an object is gripped and when the object is not gripped, a desired torque needs to be suitably changed according to whether the objects are gripped.

However, when an object is gripped in a still state, the mass and the inertia moment are switched between the two states including the gripped state and the non-gripped state. For this reason, the output torque is switched, and a robot arm moves in some cases despite the still state of the desired position of the robot arm. This might damage a gripped object and might cause drop and tumbling of the gripped object or the like, thereby causing a problem from a viewpoint of the safety.

In contrast to switching a mass and an inertia moment in a robot that grips an object, Patent Literature 1 discloses a control device that does not make a calculation by switching a mass and an inertia moment but adds a feed forward term to control a robot (See Patent Literature 1)

CITATION LIST

Patent Literature

Patent Literature 1: JP 63-8912 A

SUMMARY OF THE INVENTION

In Patent Literature 1, however, although an operation for switching between two states that the calculation of the feed forward term is added and not added is generated, a countermeasure is not taken against a case where a robot moves according to the switching operation.

One non-limiting and exemplary embodiment provides the above conventional problem and provide a gripped object-friendly, external environment-friendly, and safe robot, a robot control device, a robot control method, and a robot control program, each of which does not damage, drop nor tumble an object or a structure even when dynamics parameters (for example, a mass and an inertia moment of a gripped object) is switched at a time of gripping and releasing the object.

In one general aspect, the techniques disclosed here feature: a robot having joints, comprising:

a position information acquiring section that acquires time series information about a position of the robot, speed information thereof, or acceleration information thereof;

a dynamics parameter switching section that switches a gravity term component and an inertia force term component of a motion equation separately between a plurality of dynamics parameters having the dynamics parameter of the robot in a state where the robot does not grip an object and the dynamics parameter including the object gripped by the robot in a state where the robot arm grips the object; and a desired torque calculation section that outputs a desired value of a joint torque of the robot as a desired joint torque based on the motion equation after the dynamics parameter switching section switches the dynamics parameters and the time series information about the position of the robot, the speed information thereof, or the acceleration information thereof acquired by the position information acquiring section, wherein an operation of the robot is controlled based on an output from the desired torque calculation section.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the robot, the robot control device, the robot control method, and the robot control program of the aspect of the present invention, an inertia force term component, namely, an inertia matrix and a gravity term component in the dynamics parameters are separated from each other and are independently switched, so that directional properties of motions, such as a vertical direction and a horizontal direction caused by the switching of the dynamic parameters can be controlled.

BRIEF DESCRIPTION OF DRAWINGS

These and other aspects and features of the present disclosure will become clear from the following description taken in conjunction with the embodiments thereof with reference to the accompanying drawings, in which:

FIG. 15 is a view describing timings of the dynamics parameter switching and the elastic force switching in the conveyance task according to the third embodiment of the present invention.

DETAILED DESCRIPTION

Figure 1:
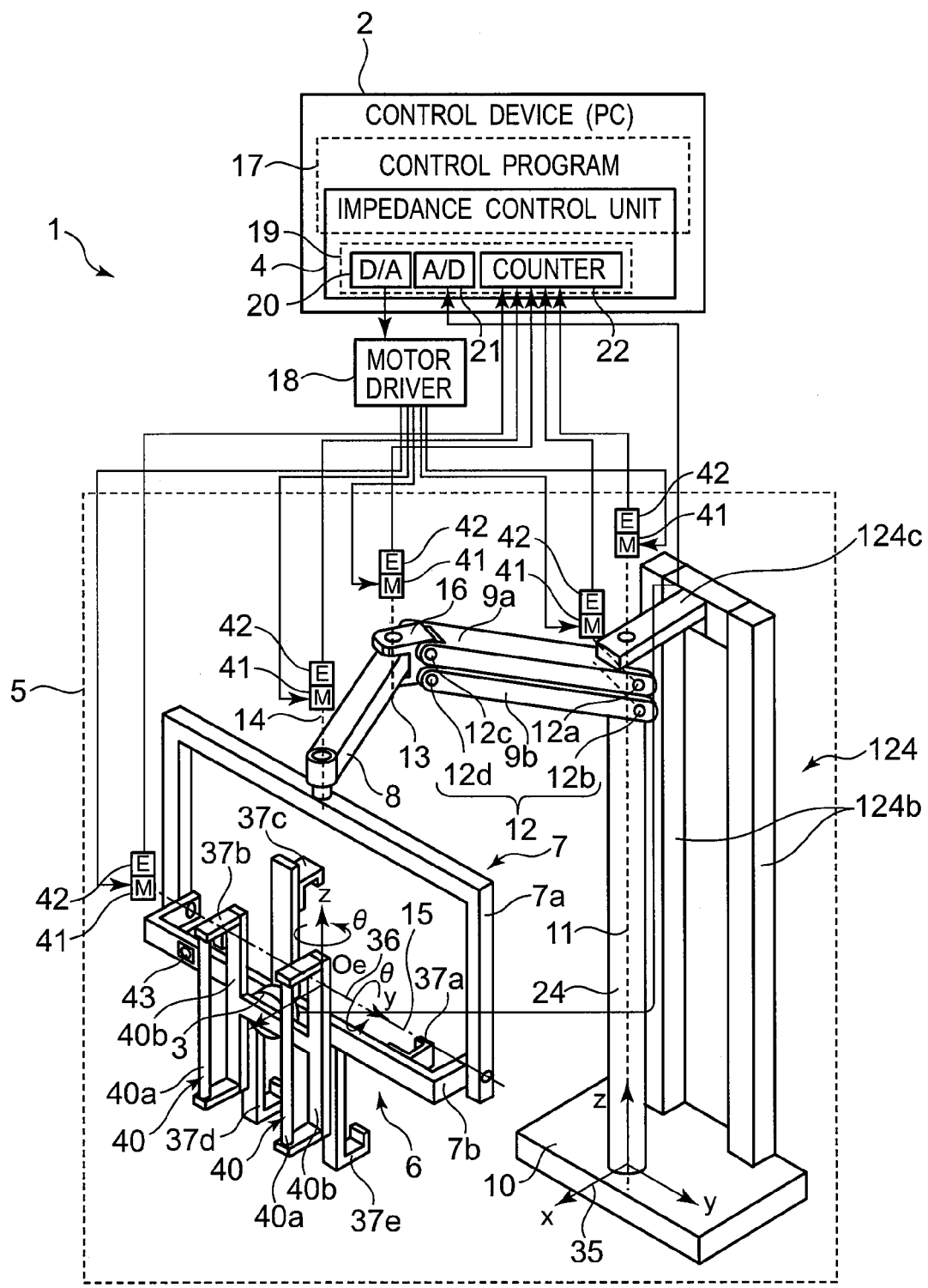
FIG. 1 is a view illustrating the overall structure of a robot according to a first embodiment of the present invention.

Before the description of the various embodiments proceeds, various approaches made by the inventors to accomplish the embodiments are explained.

Examples of the disclosed technique are as folio ws.

1st aspect: a robot having joints, comprising:
a position information acquiring section that acquires time series information about a position of the robot, speed information thereof, or acceleration information thereof;
a dynamics parameter switching section that switches a gravity term component and an inertia force term component of a motion equation separately between a plurality of dynamics parameters having the dynamics parameter of the robot in a state where the robot does not grip an object and the dynamics parameter including the object gripped by the robot in a state where the robot arm grips the object; and
a desired torque calculation section that outputs a desired value of a joint torque of the robot as a desired joint torque based on the motion equation after the dynamics parameter switching section switches the dynamics parameters and the time series information about the position of the robot, the speed information thereof, or the acceleration information thereof acquired by the position information acquiring section,
wherein an operation of the robot is controlled based on an output from the desired torque calculation section.

2nd aspect: the robot according to the 1st aspect, wherein the dynamics parameter switching section switches the gravity term component and the inertia force term component of the motion equation for the robot and the object gripped by the robot separately in the plurality of dynamics parameters based on a switching signal of an object gripping task and an object gripping releasing task according to a timing of switching between a restrained state that an arm end point of the robot is restrained so as to be difficult in moving at a time when the arm end point of the robot grips the object and in a non-restrained state.

3rd aspect: the robot according to the 2nd aspect, wherein the dynamics parameter switching section switches only the dynamics parameter of the inertia force term component when the arm end point of the robot is in the non-restrained state based on the time series information about the position of the robot, the speed information, or the acceleration information acquired by the position information acquiring section.

4th aspect: the robot according to the 3rd aspect, wherein the dynamics parameter switching section switches only the dynamics parameter of the inertia force term component when the arm end point of the robot grips the object, and after the gripped object is set, the gripping is released, and the arm end point of the robot is in the non-restrained state.

5th aspect: the robot according to the 1st aspect, wherein the dynamics parameter switching section switches only the dynamics parameter of the inertia force term component when an operation speed is lower than that at a conveying time so that positioning for the gripping or the setting is performed when the robot grips the object, conveys the object, and sets the gripped object.

6th aspect: the robot according to the 1st aspect, wherein the dynamics parameter switching section switches the dynamics parameter of the gravity term component separately at a plurality of stages.

7th aspect: the robot according to the 1st aspect, wherein the dynamics parameter switching section switches a dynamics parameter of a centrifugal force and Coriolis force term of the motion equation as well as the inertia force term component when the dynamics parameter of the inertia force term component is switched.

8th aspect: the robot according to the 1st aspect, further comprising:
a robot arm driven by an elastic body actuator; and
an elastic force control section that controls an elastic force of the arm end point of the robot arm generated by the elastic body actuator of the robot,
wherein the elastic force control section applies an elastic force in a direction where an effect of a motion of the arm endpoint of the robot arm generated at a time of switching the dynamics parameters by the dynamics parameter switching section is suppressed.

9th aspect: the robot according to the 8th aspect, further comprising:
the robot arm driven by the elastic body actuator; and
the elastic force control section that controls the elastic force of the arm end point of the robot arm generated by the elastic body actuator of the robot,
wherein the elastic force control section controls to apply an elastic force in a direction where restraint of the arm end point is canceled before the dynamics parameter of the inertia force term component is switched after the object gripped by the arm end point is set.

10th aspect: a control device of a robot having joints, comprising:
a position information acquiring section that acquires time series information about a position of the robot, speed information thereof, or acceleration information thereof;
a dynamics parameter switching section that switches a gravity term component and an inertia force term component of a motion equation separately between a plurality of dynamics parameters having the dynamics parameter of the robot in a state where the robot does not grip an object and the dynamics parameter including the object gripped by the robot in a state where the robot arm grips the object; and a desired torque calculation section that outputs a desired value of a joint torque of the robot as a desired joint torque based on the motion equation after the dynamics parameter switching section switches the dynamics parameters and the time series information about the position of the robot, the speed information thereof, or the acceleration information thereof acquired by the position information acquiring section, wherein an operation of the robot is controlled based on an output from the desired torque calculation section.

11th aspect: a control method of a robot having joints, comprising:

acquiring time series information about a position of the robot, speed information thereof, or acceleration information thereof by a position information acquiring section;

switching a gravity term component and an inertia force term component of a motion equation separately between a plurality of dynamics parameters having the dynamics parameter of the robot in a state where the robot does not grip an object and the dynamics parameter including the object gripped by the robot in a state where the robot arm grips the object, by a dynamics parameter switching section;

outputting a desired value of a joint torque of the robot as a desired joint torque by a desired torque calculation section based on the motion equation after the dynamics parameter switching section switches the dynamics parameters and the time series information about the position of the robot, the speed information thereof, or the acceleration information thereof acquired by the position information acquiring section; and controlling an operation of the robot based on an output from the desired torque calculation section.

12th aspect: a computer-readable recording medium including a control program of a robot having joints for allowing a computer to execute:

a function of a position information acquiring section that acquires time series information about a position of the robot, speed information thereof, or acceleration information thereof;

a function of a dynamics parameter switching section that switches a gravity term component and an inertia force term component of a motion equation separately between a plurality of dynamics parameters having the dynamics parameter of the robot in a state where the robot does not grip an object and the dynamics parameter including the object gripped by the robot in a state where the robot arm grips the object;

a function of a desired torque calculation section that outputs a desired value of a joint torque of the robot as a desired joint torque based on the motion equation after the dynamics parameter switching section switches the dynamics parameters and the time series information about the position of the robot, the speed information thereof, or the acceleration information thereof acquired by the position information acquiring section; and a function for controlling an operation of the robot based on an output from the desired torque calculation section.

Referring now to the accompanied drawings the embodiments of the present disclosure will be described in detail below.

First Embodiment

FIG. 1 illustrates the structure of a robot 1 according to a first embodiment of the present invention. The robot 1 includes a multi-joint robot arm 5, and a control device 2 that controls the operation of the multi-joint robot arm 5.

The control device 2 is structured by an ordinary personal computer in hardware. Further, parts of the control device 2 except for an input/output IF 19 of an impedance control unit (an impedance control section or a robot arm control section) 4 are realized in software as a control program 17 executed by the personal computer. Therefore, for example, a computer program having steps composing respective operations is stored readably in a recording medium such as a memory device (hard disc or the like), and the computer program is loaded into a temporary memory device (semiconductor memory or the like) of the computer so as to be run using a CPU and enable the respective steps to be executed.

The input/output IF 19 is structured by a D/A board 20, an A/D board 21, and a counter board 22 each connected to an extension slot such as a PCI bus of the personal computer.

Execution of the control program 17 for controlling the operation of the multi-joint robot arm 5 of the robot 1 enables the control device 2 to function.

Joint angle information output from respective encoders 42 as one example of joint angle sensors or a position information acquiring unit (position information acquiring section) of respective joints (first to fifth joints) 11, 12 (12a, 12b, 12c, 12d), 13, 14, and 15 of the robot arm 5 are taken into the control device 2 via the counter board 22. The control device 2 calculates control command values for the rotary operations performed in the joints 11, 12, 13, 14, and 15 about the joint axes, based on the acquired joint angle information. The calculated control command values are provided to a motor driver 18 through the D/A board 20, and motors 41 of respective joints 11, 12, 13, 14, and 15 of the robot arm 5 are driven according to the control command values sent from the motor driver 18. The position information acquiring unit has a function for acquiring time series information about the position of the robot arm 5.

The robot arm 5 is a multi-link manipulator with five degrees of freedom, and includes a hand (which serves as an example of the arm end point of the multi-joint robot arm 5) 6 for gripping an object, a front arm link 8, an elbow block 16, a pair of upper arm links 9a and 9b, a first joint pillar 24, and a pedestal part 10.

The front arm link 8 has its wrist part 7 connected rotatably about a joint axis of the fourth joint 14. A hand 6 is attached to the tip of the wrist part 7.

A proximal end of the front arm link 8 is coupled to one end of an elbow block 16 rotatably about the joint axis of the third joint 13.

The paired upper arm links 9a and 9b are constituted in a parallel link structure, in which their one ends are connected to the other end of the elbow block 16 so as to be rotatable about the joint axes of the two joints 12c and 12d of the second joint 12.

The first joint pillar 24 is supported by the pedestal part 10 and a support member 124 so as to be positioned along the top-bottom direction and to be rotatable about the joint axis of the first joint 11. The other ends of the upper arm links 9a and 9b are connected to the part near the upper end of the first joint pillar 24 so as to be rotatable about the joint axes of the two joints 12a and 12b of the second joint 12. Specifically, the lower end of the first joint pillar 24 is supported at the pedestal part 10 so as to be rotatable about the joint axis of the first joint 11. The upper end of the first joint pillar 24 is supported at an upper end support part 124c of the support member 124 projecting from the upper end of the support part 124b of the support member 124 provided upright at the pedestal part 10, so as to be rotatable about the joint axis of the first joint 11.

The elbow block 16 rotates about the second joint 12a and the second joint 12b such that the joint axis of the third joint 13 constantly maintains to be in parallel with the joint axis of the first joint 11 by the rotation about the joint axes of the second joints 12 (12a, 12b, 12b, and 12d).

In this manner, the robot arm 5 composes the multi-link manipulator of five degrees of freedom, in which the rotation about a total of five axes is enabled.

The wrist part 7 is composed of a combination of a square bracket-shaped (1) first bracket part 7a and a second bracket part 7b, which is structured by an inverted T-shaped upper part and a pair of L-shaped lower parts, thereby composing the hand 6. That is, the upper end central part of the first bracket part 7a is coupled to the tip of the front arm link 8 so as to be rotatable about the joint axis of the fourth joint 14. On the inner sides of the opposing ends of the first bracket part 7a, the opposing ends of the inverted T-shaped upper part of the second bracket part 7b are coupled so as to be capable of rotating about the joint axis of the fifth joint 15. As will be described later, an operational handle 40 is attached to the central part of the inverted T-shaped upper part of the second bracket part 7b. In the second bracket part 7b, fingers 37a, 37b, 37c, 37d, and 37e that can be engaged with an object such as a panel of a flat type television set are provided to a total of 5 places including the upper end of the inverted T-shaped upper part and the parts near the opposing ends, and the lower ends of the paired L-shaped lower parts. Further, a hand button 43 is disposed near the operational handle 40 of the second bracket part 7b. The pressing of the hand button 43 allows a signal $S_{hb}$ indicating whether the hand button 43 is pressed to be output to a hand control unit (hand control section) 34. The driving of a motor, not shown, enables reciprocation to one direction so that a gap between the finger 37a and the finger 37b, and a gap between the finger 37c and the finger 37d (the finger 37e) can be changed. The hand button 43, thus, functions as an opening/closing operation of the hand 6. As a result, for example, the finger 37c at the upper end of the inverted T-shaped upper part of the second bracket part 7b, and the fingers 37a and 37b near the opposing ends support an upper edge and opposing side edges of a rectangular plate-shaped object such as a panel of a flat type television set. The fingers 37d and 37e at the lower ends of the paired L-shaped lower parts of the second bracket part 7b can support the lower edge of the rectangular plate-shaped object such as the panel of the flat type television set. As a result, the hand 6 can grip or release the rectangular plate-shaped object such as the panel of the flat type television set stably. Hence, the hand 6 has two rotary axes of the fourth joint 14 and the fifth joint 15 that are perpendicular to each other. The fourth joint 14 is arranged along the top-bottom direction, and the fifth joint 15 is arranged along the lateral direction being perpendicular to the top-bottom direction. Accordingly, the hand 6 can change its relative orientation (direction) with respect to the pedestal part 10 so as to be capable of change the relative orientation (direction) of the object gripped by the hand 6.

The joints 11, 12a, 13, 14, and 15 composing the rotary parts of respective shafts are each provided with a rotary driving device (a motor 41 in the first embodiment) provided at one member of each of the joints 11, 12a, 13, 14, and 15, and the encoder 42 for detecting a rotary phase angle (i.e., a joint angle) of the rotary shaft of the motor 41. Then, when the rotary shaft of the motor 41 is coupled with the other member of each of the joints and is allowed to rotate positively and rotate negatively, the other member can be rotated about each of the joint shaft with respect to the one member. The rotary driving device is controlled by the motor driver 18, which will be described later. In the first embodiment, the motor 41 and the encoder 42 exemplifying the rotary driving device are arranged in each of the joints 11, 12a, 13, 14, and 15 of the robot arm 5.

The reference numeral 35 in FIG. 1 denotes an absolute coordinate system in which a relative positional relationship with respect to the pedestal part 10 is fixed, and the reference numeral 36 denotes an arm end point coordinate system in which a relative positional relationship with respect to the hand 6 is fixed. It is defined as follows: the origin position $O_e$ (x, y, z) of the arm end point coordinate system 36 as seen from the absolute coordinate system 35 is the arm end point position of the robot arm 5; ($\phi$, $\theta$) being the representation in the roll angle and the pitch angle of the orientation of the arm end point coordinate system 36 as seen from the absolute coordinate system 35 is the arm end point orientation of the hand 6 of the robot arm 5; and the arm end point position and orientation vector "r" of the hand 6 is defined as r=[x, y, z, $\phi$, $\theta$]$^T$. Strictly speaking, the position and the orientation vector r are such that the time series information (time function) r(t)=[x(t), y(t), z(t), $\phi$(t), $\theta$(t)]$^T$ and first-order differentiation can provide a speed, and second-order differentiation can provide acceleration information.

In this embodiment, the encoder 42 is used as one example of the position information acquiring unit (position information acquiring section) for acquiring the time series information about the position of the robot arm 5. In this case, since a signal sensed by the encoder 42 is primary information about the position, the encoder 42 is treated as one example of the position information acquiring unit. A robot arm control unit (a robot arm control section) 4, namely, the impedance control section may carry out first-order differentiation on the information about the position acquired by the position information acquiring unit so as to acquire speed information, and may carry out second-order differentiation thereon so as to acquire acceleration information. Further, when the position information acquiring unit is treated as a unit (section) for acquiring not only the time series information about the position of the robot arm 5 but also the speed information or the acceleration information, this unit (section) is considered as one means including the sensing in the encoder 42, the taking into the impedance control unit 4 by the counter board 22, the transformation into a joint angle q by the control program, and the transformation into the position and the orientation by a forward kinematics calculation unit (forward kinematics calculation section) 26.

When the arm end point position and orientation of the hand 6 of the robot arm 5 is to be controlled, the arm end point position and orientation vector r is caused to follow the desired arm end point position and orientation vector $r_d$.

The operational handle 40 is connected to the hand 6 via the force sensor 3 functioning as an example of an external force acquiring unit (an external force acquiring section or an external force acquiring device). The operational handle 40 is composed of a pair of bar-like grip parts 40a that is fixed to an H-shaped support body 40b, at the central part of which is fixed to the force sensor 3 and extends along the top-bottom direction. Thus, the person 39 can directly grip the pair of grip parts 40a of the operational handle 40 and apply a force thereto so as to be capable of manipulating the robot arm 5. The force sensor 3 is disposed between the operational handle 40 and the robot arm 5. A force $F_s$ generated when the person 39 manipulates is detected by the force sensor 3 so as to be capable of being output to a force transformation unit (force transformation section) 30, described later.

Figure 2:
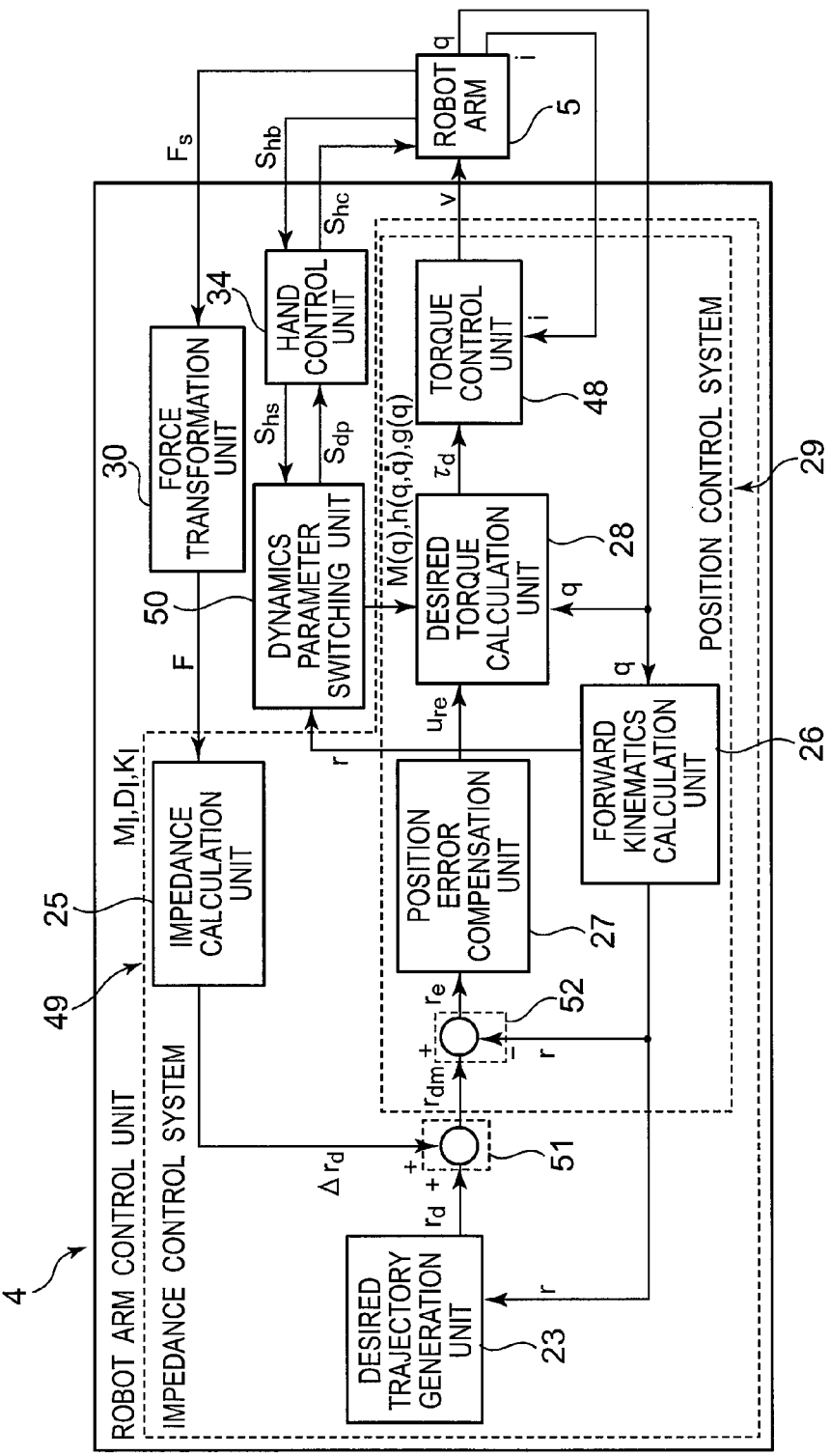
FIG. 2 is a block diagram illustrating the structure of a impedance control unit of the robot according to the first embodiment of the present invention.

Next, detailed description about the impedance control unit 4 will be given with reference to FIG. 2. In FIG. 2, the reference numeral 5 denotes the robot arm shown in FIG. 1. A current value (joint angle vector) $q=[q_1, q_2, q_3, q_4, q_5]^T$ of the joint angle measured by the encoder 42 of the joint shaft of each joint is output from the robot arm 5, and is taken into the impedance control unit 4 by the counter board 22. Here, ($q_1$, $q_2$, $q_3$, $q_4$, and $q_5$ are the joint angles of the first joint 11, the second joint 12a, the third joint 13, the fourth joint 14, and the fifth joint 15.

Further, an external force (measured value) $F_S=[f_x, f_y, f_z, n_x, n_y, n_z]^T$ measured by the force sensor 3 is output from the force sensor 3 of the robot arm 5, and is taken into the impedance control unit 4 by the A/AD board 21. Here, $f_x$, $f_y$, and $f_z$ are components of the force in respective three directions (x axial, y axial, and z axial directions) perpendicular to each other in the arm endpoint coordinate system 36. Further, $n_x$, $n_y$, and $n_z$ are rotation moments about the three directions perpendicular to each other in the arm end point coordinate system 36.

Desired trajectory generation unit (a desired trajectory generation section) 23 outputs a desired arm endpoint position and orientation vector $r_d$ for realizing the desired operation of the robot arm 5. In the desired operation of the robot arm 5, positions ($r_{d0}, r_{d1}, r_{d2}, \ldots$) at respective points at times ($t=0, t=t_1, t=t_2, \ldots$) are provided as time series data in advance according to objective tasks. The desired trajectory generation unit 23 interpolates the trajectories between the respective points using polynomial interpolation, and generates the desired arm endpoint position and orientation vector $r_d$.

An impedance calculation unit (an impedance calculation section) 25 is a section that provides the robot arm 5 with the function of realizing to control over the values of the mechanical impedance of the robot arm 5 to the mechanical impedance set values. The impedance calculation unit 25 outputs 0 when the robot arm 5 solely operates under position control so as to follow the desired trajectory generated by the desired trajectory generation unit 23. On the other hand, when the robot arm 5 and person perform cooperation tasks, the impedance calculation unit 25 calculates the desired arm endpoint position and orientation correction output $\Delta r_d$ for making the robot arm 5 realize mechanical impedance according to the following formula (I) based on set impedance parameters $M_I$, $D_I$, and $K_I$ (inertia $M_I$, damping $D_I$, and, stiffness $K_I$), the external force $F=[f_x, f_y, f_z, n_\phi, n_\theta]^T$ input into the force transformation unit (force transformation section) 30, described later, and the joint angle data (joint angle vectors q) from the respective encoders 42, and outputs them. The desired arm end point position and orientation correction output $\Delta r_d$ is added to the desired arm end point position and orientation vector $r_d$ output from the desired trajectory generation unit 23 by a first calculation sector 51, so that a desired arm endpoint position and orientation correction vector $r_{dm}$ are generated. Here, $n_\phi$ and $n_\theta$ denote rotation moments about a roll axis and a yaw axis.

$$\Delta r_d = (s^2 M_I + sD_I + K_I)^{-1} F \quad (1)$$

Here, $$M_I = \begin{bmatrix} M_I & 0 & 0 & 0 & 0 \\ 0 & M_I & 0 & 0 & 0 \\ 0 & 0 & M_I & 0 & 0 \\ 0 & 0 & 0 & M_I & 0 \\ 0 & 0 & 0 & 0 & M_I \end{bmatrix} \quad (2)$$

$$D_I = \begin{bmatrix} D_I & 0 & 0 & 0 & 0 \\ 0 & D_I & 0 & 0 & 0 \\ 0 & 0 & D_I & 0 & 0 \\ 0 & 0 & 0 & D_I & 0 \\ 0 & 0 & 0 & 0 & D_I \end{bmatrix} \quad (3)$$

$$K_I = \begin{bmatrix} K_I & 0 & 0 & 0 & 0 \\ 0 & K_I & 0 & 0 & 0 \\ 0 & 0 & K_I & 0 & 0 \\ 0 & 0 & 0 & K_I & 0 \\ 0 & 0 & 0 & 0 & K_I \end{bmatrix} \quad (4)$$

and s denotes a Laplacian operator.

The forward kinematics calculation unit (forward kinematics calculation section) 26 receives, through the counter board 22, the joint angle vector q being the current value q of the joint angle output from the encoder 42 of each joint shaft of the robot arm 5. The forward kinematics calculation unit 26 geometrically calculates the transformation from the joint angle vector q of the robot arm 5 to the arm end point position and orientation vector r.

The second calculation section 52 obtains an error $r_e$ between the arm end point position and orientation vector r calculated by the forward kinematics calculation unit 26, and the desired arm end point position and orientation correction vector $r_{dm}$ generated by the first calculation section 51, and outputs the obtained error $r_e$ to a position error compensation unit (position error compensation section) 27.

The position error compensation unit 27 obtains a position error compensation output $u_{re}$ based on the error $r_e$ obtained by the second calculation section 52, and outputs the obtained position error compensation output $u_{re}$ to a desired torque calculation unit (desired torque calculation section) 28.

The desired torque calculation unit 28 calculates a desired torque (desired joint torque) $\tau_d$ to be generated on each joint of the robot arm 5 using the joint angle vector q from the encoders 42, the position error compensation output $u_{re}$ from the position error compensation unit 27, and a calculation formula (5) based on a robot arm motion equation, namely, $$\tau_d = M(q)J_r^{-1}(q)[-\dot{J}_r(q)\dot{q}+u_{re}]+h(q,\dot{q})+g(q) \quad (5)$$

and outputs the calculated desired torque $\tau_d$. Here, $M(q)$ denotes an inertia matrix (inertia force term), $$h(q,\dot{q})$$

denotes a centrifugal force/Coriolis force term, $g(q)$ denotes a gravity term, and the inertia matrix, the centrifugal force/Coriolis force term, and the gravity term are dynamics parameters composed of values such as each link structure composing the robot arm 5, a weight of an object gripped by the hand 6, and an inertia moment. The centrifugal force/Coriolis force term is arbitrary, and thus at least the inertia matrix (inertia force term) and the gravity term compose the dynamics parameters. Further, $J_r(q)$ denotes a Jacobi matrix that satisfies a formula (6), namely, a relationship of $$\dot{r}=J_r(q)(\dot{q}). \quad (6)$$

Dynamics parameter switching unit (dynamics parameter switching section) 50 has a function that switches the dynamics parameters in the formula (5) calculated by the desired torque calculation unit 28

$$M(q),h(q,\dot{q}),g(q)$$

into dynamics parameters in a case of only the robot arm 5 and the hand 6 in the state that the robot arm 5 does not grip an object $M_r(q), h_r(q,\dot{q}), g_r(q),$ or dynamics parameters in a case where the object 46 is included as well as the robot arm 5 and the hand 6 in the state that the robot arm 5 grips the object $M_{ro}(q), h_{ro}(q,\dot{q}), g_{ro}(q)$ independently and separately according to the inertia matrix, the centrifugal force/Coriolis force term, and the gravity term. Further, a dynamics parameter switching completion signal $S_{dp}$ is output from the dynamics parameter switching unit 50 into the hand control unit 34.

When the switching operation of the dynamics parameters to be performed by the dynamics parameter switching unit 50 is performed in a stepped manner, the control becomes non-continuous and unstable. For this reason, the switching operation is performed continuously for a short time, such as 100 msec, so that the stability is secured.

Torque control unit 48 calculates a voltage command value v to be provided to the motor driver 18 based on the desired torque $\tau_d$ obtained by the desired torque calculation unit 28 and an electric current i flowing in the motor 41 detected by the motor driver 18 for driving each joint, using a formula (7), namely, $$v = K_\tau(\tau_d - K_M i). \tag{7}$$

Here, $K_\tau$ denotes a gain of the torque control, and $K_M$ denotes a torque constant.

The voltage command value v is provided as a voltage command value from the torque control unit 48 to the motor driver 18 through the D/A board 20. The motor driver 18 drives each motor 41 to rotate each joint shaft positively and negatively, so that the robot arm 5 operates.

The hand control unit 34 outputs a hand control signal $S_{hc}$ based on the signal $S_{hb}$ representing whether the hand button 43 is pressed and the dynamics parameter switching completion signal $S_{dp}$ from the dynamics parameter switching unit 50 so as to control the opening/closing operation of the hand 6. Further, the hand control unit 34 outputs a hand operation state signal $S_{hs}$ to the dynamics parameter switching unit 50 in order to notify about the gripping or releasing operation state of the hand 6.

A description will be given of the basic principle of the operation as to the basic structure of the impedance control unit 4 structured as described above.

The basic operation is the feedback control (position control) over the arm end point position and orientation error $r_e$ exerted by the position error compensation unit 27. The portion enclosed by a broken line in FIG. 2 is a position control system 29. Use of a PID compensator as the position error compensation unit 27 realizes control under which the arm end point position and orientation error $r_e$ converges to 0. Thus, the desired impedance control operation of the robot arm 5 can be realized.

When the impedance control is exerted, with respect to the above-described position control system 29, the desired arm end point position and orientation correction output $\Delta r_d$ output from the impedance calculation unit 25 is added to the desired arm end point position and orientation vector $r_d$ output from the desired trajectory generation unit 23 by the first calculation section 51, so that the arm end point position and orientation desired value is corrected. The corrected arm end point position and orientation desired value is input as the desired arm endpoint position and orientation correction vector $r_{dm}$ into the position control system 29. Accordingly, with the position control system 29 described above, the arm end point position and orientation desired value slightly deviates from the original value, and consequently the mechanical impedance is realized. The portion described above enclosed by the alternate long and short dash line in FIG. 2 is the structure referred to as a position control-based impedance control system 49, and the impedance control system 49 realizes the mechanical impedances of inertia $M_I$, damping $D_I$ and stiffness $K_I$. The impedance control unit 4 functions as one example of the operation control unit or the operation control unit.

Figure 3:
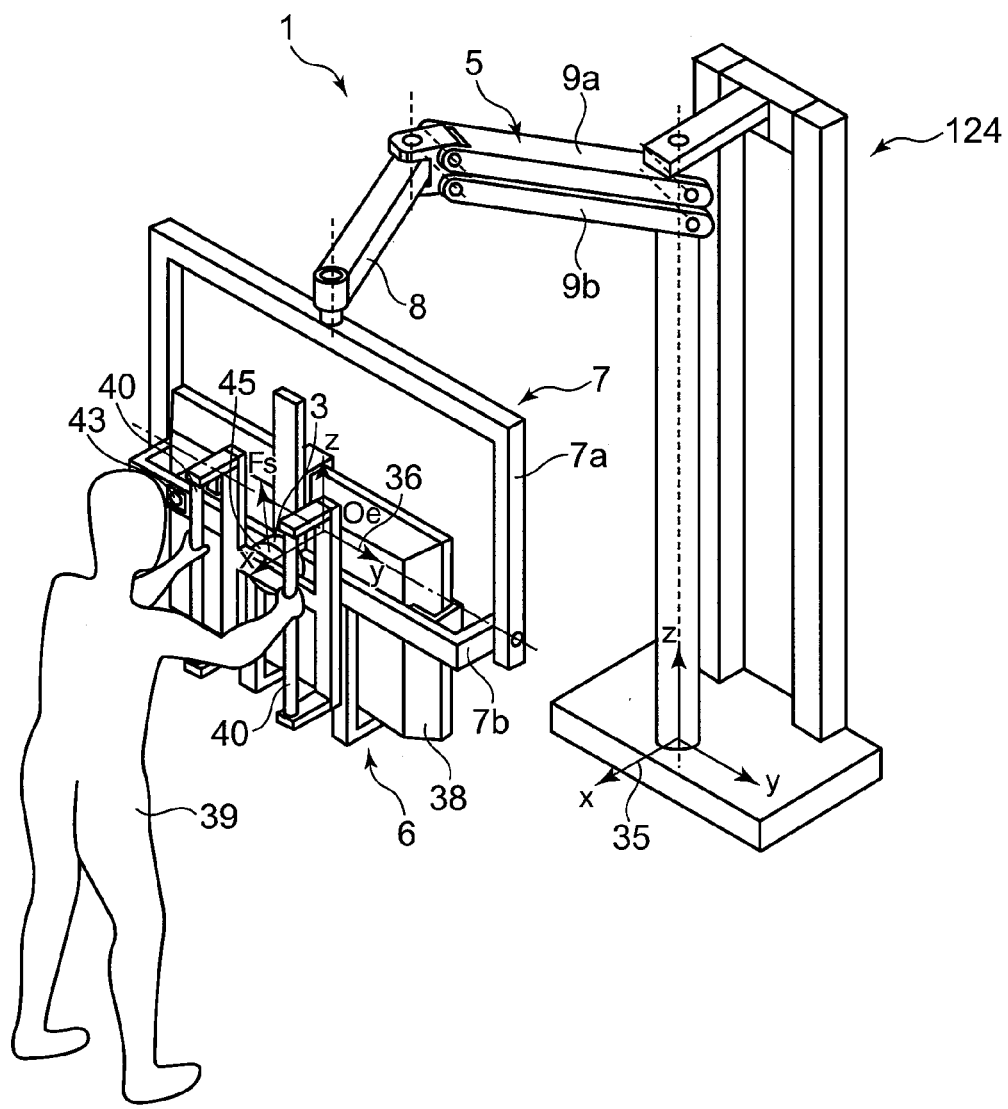
FIG. 3 is a view describing a cooperative conveyance task carried out by a person and the robot according to the first embodiment of the present invention.

The utilization of the above impedance control enables the cooperation task such as the cooperative conveyance of the object 38 between the person 39 and the robot arm 5 of the robot 1 as shown in FIG. 3. When the person 39 applies a force with both hands to the pair of bar-like grip parts 40a of the operational handle 40 in an attempt to shift the object 38, the force is transferred to the robot arm 5 of the robot 1 through the operational handle 40. The force transferred to the robot arm 5 is detected as an external force $F_s$ by the force sensor 3 of the robot arm 5. As to the external force $F_s$ to be an input into the impedance control unit 4, the gravity of the operational handle 40 is taken into consideration, and a difference between an origin $O_e$ of the arm end point coordinate system 36 and a position of a measurement surface 45 of the force sensor 3 is taken into consideration. For this reason, the force transformation unit 30 makes a calculation based on the external force $F_s$ detected by the force sensor 3 according to the formula (8), and an external force F calculated in this calculation is used.

$$F = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \end{pmatrix} \tag{8}$$

$$\left( \begin{pmatrix} {}^0R_e & 0 \\ 0 & {}^0R_e \end{pmatrix} \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & l_{se} & 0 & 1 & 0 \\ 0 & l_{se} & 0 & 0 & 0 & 1 \end{pmatrix} F_s - mg \begin{pmatrix} 0 \\ 0 \\ 1 \\ 0 \\ l_{sh}\cos\theta \\ 0 \end{pmatrix} \right)$$

Here, m denotes a mass of the operational handle 40, g denotes an acceleration of gravity, ${}^0R_e$ denotes a rotation matrix for transforming an orientation from the arm end point coordinate system 36 into the absolute coordinate system 35, $l_{se}$ denotes a distance from the origin $O_e$ of the arm end point coordinate system 36 to the measurement surface 45 of the force sensor 3, and $l_{sh}$ denotes a distance from the gravity center of the operational handle 40 to the measurement surface 45 of the force sensor 3. As described above, a pitch angle θ is a rotational angle about a y axis of the arm end point coordinate system. When the impedance control is exerted employing the external force F derived from Formula (8) as an input, the robot arm 5 operates along the direction of the force applied by the person 39. For this reason, the cooperative conveyance is realized. It is to be noted that, the mass m of the operational handle 40, and the acceleration of gravity g are previously stored in the force transformation unit 30.

Figure 4:
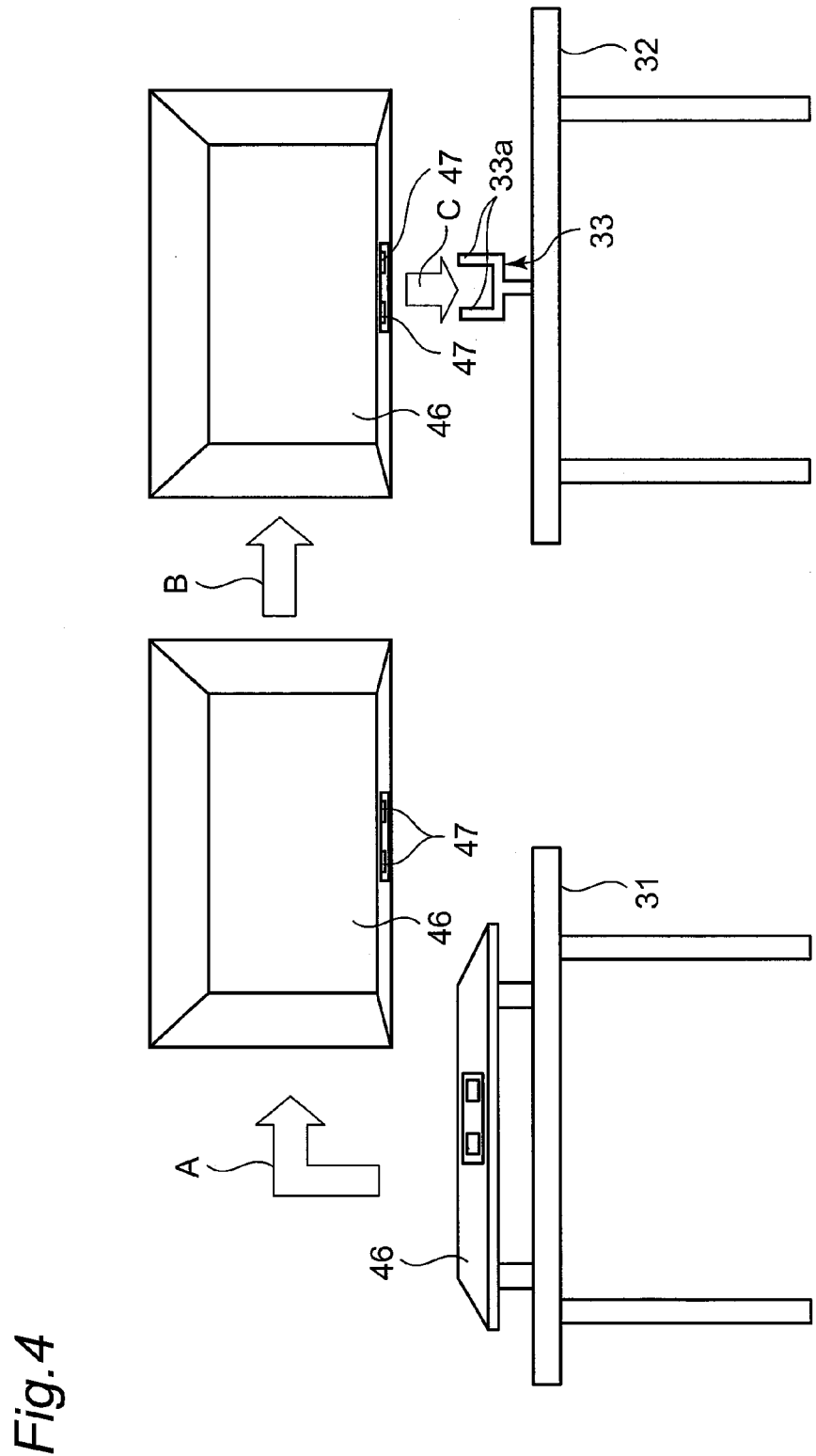
FIG. 4 is a view describing a schematic procedure of the conveyance task according to the first embodiment of the present invention.
Figure 5:
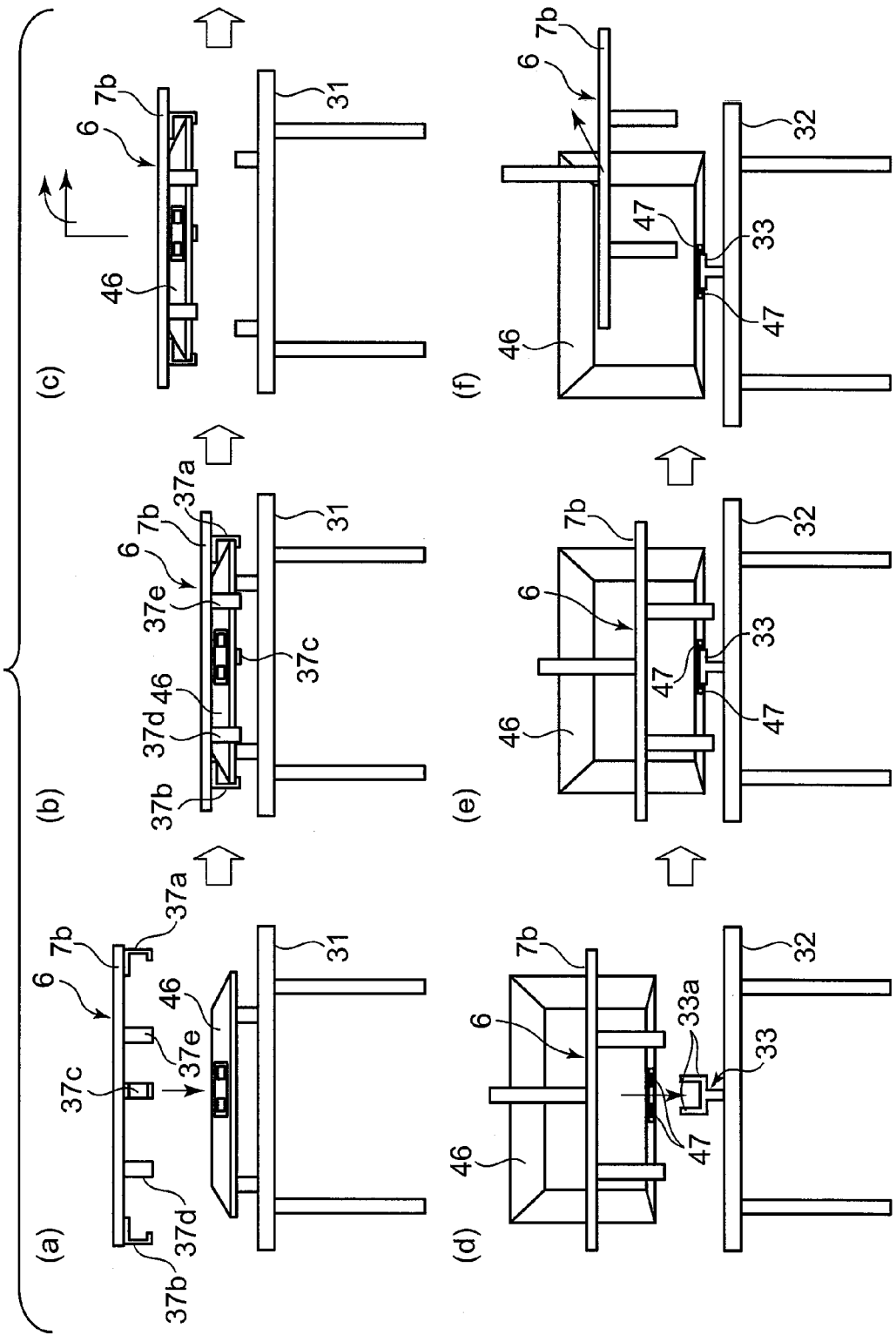
FIG. 5 is a view describing a detailed procedure of the conveyance task according to the first embodiment of the present invention.

The control device 2 of the robot 1 according to the first embodiment of the present invention is characterized by the provision of the dynamics parameter switching unit 50 in addition to the above basic constitution of the impedance control unit 4. Details are described by exemplifying a case where the object conveyance task shown in FIGS. 4 and 5 is done. FIG. 4 is a view describing a schematic procedure of the overall flow of the object conveyance task. FIG. 5 is a view describing a detailed procedure where the object conveyance task is divided into each step, and in FIG. 5, only the hand 6 in the robot 1 is illustrated. In the following, the flat type television set 46 is used as an example of the object 38.

Contents of the object conveyance task in FIG. 4 and FIG. 5 are described as follows.

First, the hand button 43 is pressed so that the hand 6 grips the flat type television set 46 placed on a first workbench 31 on the left side of FIG. 4 with the flat type television set 46 facing down (see FIG. 5(a)→(b)), and lifts the flat type television set 46 (see FIG. 5(c)).

Thereafter, the rotation through 90° about the y axis in a θ direction (see arrow A in FIG. 4) brings the flat type television set 46 into a stand state in the top-bottom direction. The flat type television set 46 is horizontally shifted by the hand 6 from a position above the first workbench 31 to a position above a second workbench 32 (see an arrow B in FIG. 4), and the flat type television set 46 gripped by the hand 6 is aligned with a Y-shaped stand 33 disposed on the second workbench 32 (see FIG. 5(c)→(d)).

Thereafter, the flat type television set 46 gripped by the hand 6 is lowered, and a pair of projections 33a of the stand 33 at the second workbench 32 is inserted into a pair of insertion holes 47 provided at the bottom face of the flat type television set 46 (see arrow C in FIG. 4 and FIG. 5(e)).

Thereafter, the hand button 43 is pressed to release the gripping by the hand 6, so that the hand 6 is disengaged from the flat type television set 46, and the object conveyance task is completed (see FIG. 5(f)).

The object conveyance task is done in such a manner.

In the state of FIG. 5(b) in the flow of the object conveyance task, in order to lift the flat type television set 46 thereafter, the dynamics parameter switching unit 50 needs to switch the dynamics parameters from the dynamics parameters $$M_r(q), h_r(q, \dot{q}), g_r(q),$$

in a case of only the robot arm 5 and the hand 6 in the state that the robot arm 5 does not grip an object 46 into the dynamics parameters $$M_{ro}(q), h_{ro}(q, \dot{q}), g_{ro}(q)$$

in a case where the object 46 is included as well as the robot arm 5 and the hand 6 in the state that the robot arm 5 grips the object 46.

Further, in a state of FIG. 5(e), in order to separate the hand 6 from the flat type television set 46 thereafter, the dynamics parameter switching unit 50 needs to switch the dynamics parameters from the dynamics parameters $$M_{ro}(q), h_{ro}(q, \dot{q}), g_{ro}(q),$$

in the case where the object 46 is included as well as the robot arm 5 and the hand 6 in the state that the robot arm 5 grips the object 46 into the dynamics parameters $$M_r(q), h_r(q, \dot{q}), g_r(q)$$

in the case of only the robot arm 5 and the hand 6 in the state that the robot arm 5 does not grip an object 46.

The switching operation of the dynamics parameter switching unit 50 makes information about an object to be subject to the task such as the weight of the flat type television set 46 to be reflected on control, so as to enable the series of the task operation.

However, since the dynamics parameters include a modeling error, and a control error is present in a control result of the impedance control unit 4, simple one switching of all the parameters in the dynamics parameter switching operation might cause a gap in the control result before and after the switching so as to cause a motion of the robot arm 5.

For example, in a state of FIG. 5(b), the hand 6 moves in the horizontal direction, the flat type television set 46 rubs against the first workbench 31, and this might cause defect on the surface of the flat type television set 46.

Further, in the state of FIG. 5(e), when the hand 6 tries to move in the horizontal direction, an excessive force is applied to the stand 33 so that the stand 33 is damaged. As a result, the flat type television set 46 might drop off the stand 33 after the hand 6 is released. Further, when the hand 6 tries to move in the horizontal direction, the flat type television set 46 and the second workbench 32 are off-balance, and thus the flat type television set 46 might tumble.

The state of FIG. 5(b) is a state that the flat type television set 46 contacts with the first workbench 31, and thus the hand 6 cannot move downward in the vertical direction. Further, the state of FIG. 5(e) is a state that the flat type television set 46 is inserted into the stand 33, and the hand 6 cannot move in the horizontal direction and downward in the vertical direction. Such a state where a contact with external environment is present and motion in a certain direction is disabled is defined as "a restrained state".

Figure 9:
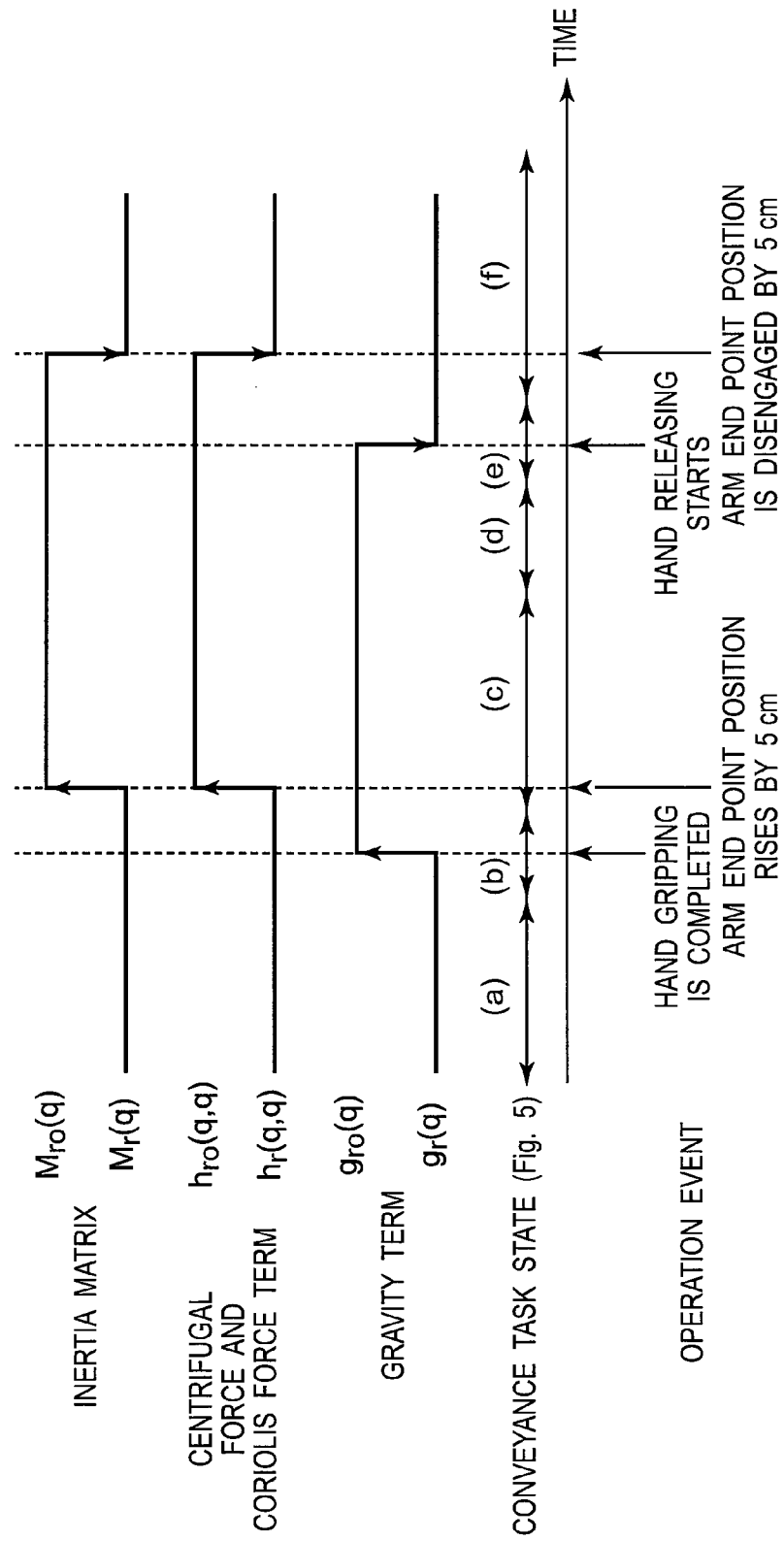
FIG. 9 is a view describing a timing of dynamics parameter switching in the conveyance task according to the first embodiment of the present invention.

In order to solve the problem caused in the restrained state, the dynamics parameter switching unit 50, as shown in FIG. 9, separates the inertia matrix, the centrifugal force and Coriolis force term, and the gravity term, respectively, so as to switch them independently.

In the state of FIG. 5(b), at the time when the closing operation is completed between the finger 37a and the finger 37b, and between the finger 37c and the finger 37d (the finger 37e), namely, the gripping by the hand 6 is completed, the dynamics parameter switching unit 50 first switches only the gravity term from $g_r(q)$ into $g_{ro}(q)$.

Thereafter, when the flat type television set 46 is lifted by a predetermined distance (namely, a small distance of, for example, 5 cm), namely, the hand 6 is in a non-restrained state that the hand 6 can freely move in all directions, the dynamics parameter switching unit 50 switches the inertia matrix and the centrifugal force and Coriolis force term from $$M_r(q), h_r(q, \dot{q})$$

into $$M_{ro}(q), h_{ro}(q, \dot{q}).$$

When the characteristics of the dynamics parameters are considered, an effect of the gravity term on the motion in the vertical direction is big, and effects of the inertia matrix and the centrifugal force and Coriolis force term on the motion in the vertical direction are comparatively small.

On the contrary, the effect of the gravity term on the motion in the horizontal direction is small, and the effects of the inertia matrix and the centrifugal force and Coriolis force term on the motion in the vertical direction are comparatively big.

Therefore, the above separation and the switching can control directional properties of the motions, such as the vertical direction and the horizontal direction caused by switching of the dynamics parameters.

In the state of FIG. 5(b), the switching of only the gravity term can suppress an unintentional motion in the horizontal direction so as to be capable of preventing the flat type television set 46 and the first workbench 31 from rubbing against each other and the surface of the flat type television set 46 from being damaged.

Thereafter, when the flat type television set 46 is disengaged from the first workbench 31, the switching of the inertia matrix and the centrifugal force and Coriolis force term prevents the surface of the flat type television set 46 from being damaged even if an unintentional motion in the horizontal direction is generated because the flat type television set 46 is disengaged from the first workbench 31.

Further, when the flat type television set 46 is lifted, the operation in the state that the flat type television set 46 is gripped is performed using the dynamics parameters in the state that the flat type television set 46 not being gripped until the inertia matrix and the centrifugal force and Coriolis force term are switched. For this reason, the maneuverability in the horizontal direction is deteriorated, but since the lifting direction is the vertical direction and a lifting distance is a short, the maneuverability less becomes a problem.

Next, in the state of FIG. 5(e), at the time point when the insertion into the stand 33 is completed, the dynamics parameter switching unit 50 first switches only the gravity term from $g_{ro}(q)$ into $g_r(q)$.

Thereafter, the hand button 43 is pressed to release the gripping of the hand 6, and the hand 6 is disengaged from the flat type television set 46 by a predetermined distance (namely, a short distance of, for example, 5 cm) to be in the non-restrained state. At this time, the dynamics parameter switching unit 50 switches the inertia matrix and the centrifugal force and Coriolis force term from $$M_{ro}(q), h_{ro}(q, \dot{q})$$

into $$M_r(q), h_r(q, \dot{q})$$

In the state of FIG. 5(e), when the dynamics parameter switching unit 50 switches only the gravity term, an unintentional motion in the horizontal direction can be suppressed. This can prevent application of an excessive force and damage to the stand 33 or can prevent the second workbench 32 from tumbling.

Thereafter, when the flat type television set 46 is disengaged from the hand 6, the inertia matrix and the centrifugal force and Coriolis force term are switched by the dynamics parameter switching unit 50. As a result, even if an unintentional motion in the horizontal direction is generated, a force is not applied to the stand 33 because the flat type television set 46 is disengaged from the hand 6.

Further, when the hand 6 is disengaged from the flat type television set 46, the operation in the state that the flat type television set 46 is not gripped is performed using the dynamics parameters in the state that the flat type television set 46 is being gripped until the dynamics parameter switching unit 50 switches the inertia matrix and the centrifugal force and Coriolis force term. For this reason, the maneuverability of the horizontal direction is deteriorated, but the maneuverability seldom becomes a problem because not a fine positioning operation but the operation for disengaging the hand 6 is performed, and the distance until the hand 6 is disengaged is short.

Figure 6:
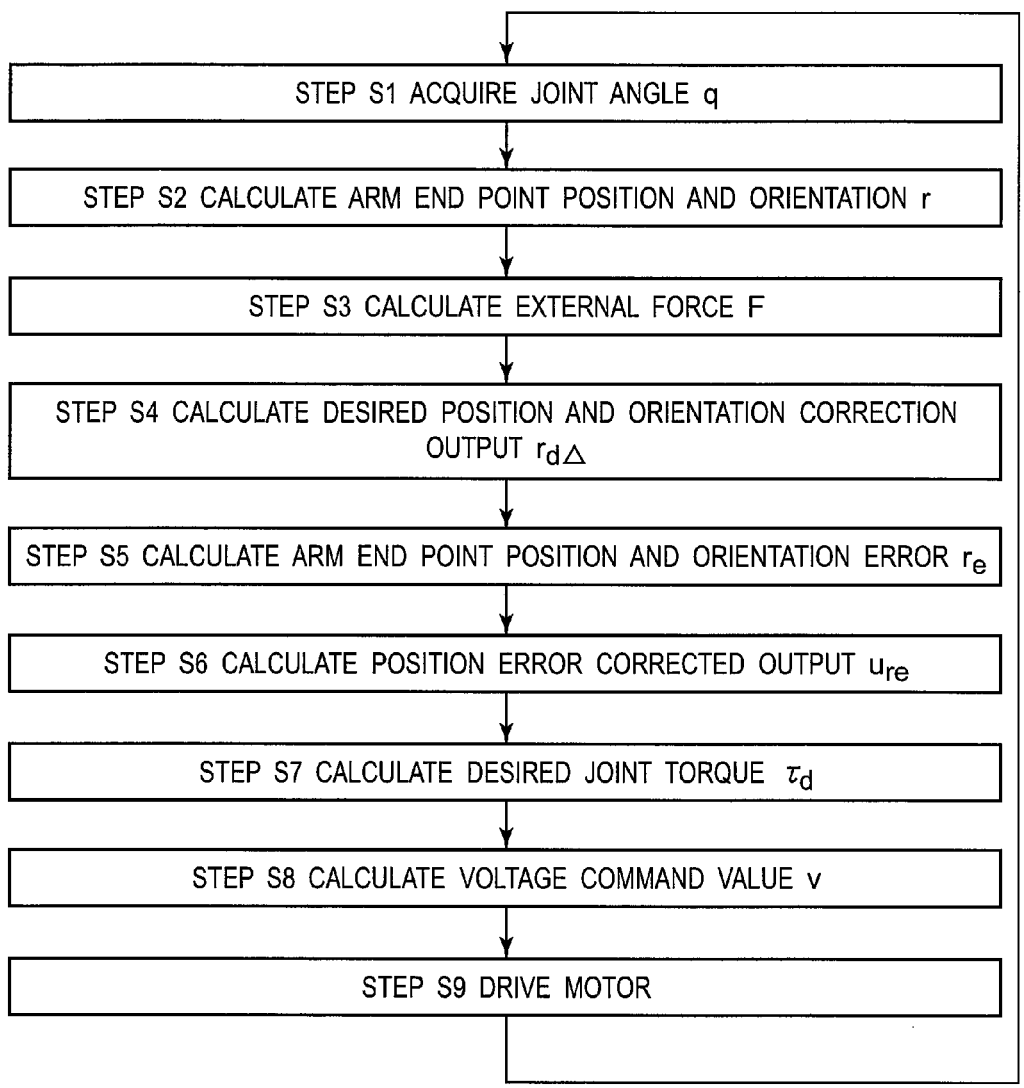
FIG. 6 is a flowchart illustrating overall operating steps of an impedance control unit in the robot according to the first embodiment of the present invention.

FIG. 6 is a flowchart describing operational steps at the time of robot arm control exerted by the control program based on the principle described above.

At step S1, when the operation of the robot arm 5 is controlled, joint angle data (the joint angle vector q) measured by the encoders 42 at the joint shafts of the joints of the robot arm 5 are taken into the control device 2.

At next step S2, the forward kinematics calculation unit 26 calculates the arm end point position and orientation vector r of the robot arm 5 at current time (when the operation of the robot arm 5 is controlled) based on the joint angle data (the joint angle vector q) from the robot arm 5 (the process in the forward kinematics calculation unit 26).

At next step S3, the external force $F_s$ as a measured value of the force sensor 3 is taken into the force transformation unit 30, and the force transformation unit 30 calculates an external force F based on the external force $F_s$ and the formula (8). As a result, the external force $F_s$ as the measured value of the force sensor 3 is transformed into the external force F by the force transformation unit 30.

At next step S4, the impedance calculation unit 25 calculates the desired arm end point position and orientation correction output $\Delta r_d$ based on the impedance parameters $M_I$, $D_I$, and $K_I$, and the joint angle data (the joint angle vectors q) from the encoders 42, and the external force F transformed by the force transformation unit 30 (the process in the impedance calculation unit 25).

At next step S5, the first calculation section 51 calculates a sum of the desired arm end point position and orientation vector $r_d$ from the desired trajectory generation unit 23 and the desired arm end point position and orientation correction output $\Delta r_d$ from the impedance calculation unit 25. The second calculation section 52 calculates an error $r_e$ of the arm end point position and orientation that is a difference between the desired arm end point position and orientation correction vector $r_{dm}$ calculated and acquired by the first calculation section 51, and the current arm end point position and orientation vector r from the forward kinematics calculation unit 26.

At next step S6, the error $r_e$ of the arm end point position and orientation calculated and acquired by the second calculation section 52 is input into the position error compensation unit 27, and the position error compensation unit 27 acquires the position error compensation output $u_{re}$ (the process in the position error compensation unit 27). Specific example of the position error compensation unit 27 may be a PID compensator. In the position error compensation unit 27, appropriate adjustment of the three gains of proportional, differential, integral structuring the diagonal matrix of constants allows the control to be exerted so that the position error converges to 0.

At next step S7, in the desired torque calculation unit 28, the position error compensation output $u_{re}$ is input from the position error compensation unit 27, and the desired torque $\tau_d$ is calculated using the formula (5) based on the joint angle vector q and the dynamics parameters determined by the dynamics parameter switching unit 50 (the process in the desired torque calculation unit 28).

At next step S8, the desired torque $\tau_d$ calculated by the desired torque calculation unit 28 and the electric current i flowing in the motor 41 are input into the torque control unit 48, and the voltage command value v is calculated by using the formula (7) (the process in the torque control unit 48).

At next step S9, the voltage command value v is provided from the torque control unit 48 to the motor driver 18 via the D/A board 20, and the motor driver 18 changes an amount of the current flowing in each of the motor 41 so as to generate a rotational motion of each joint shaft of each joint of the robot arm 5.

Repetitive execution of steps S1 to S9 as the control calculation loop realizes the control of the operation of the robot arm 5.

Figure 7:
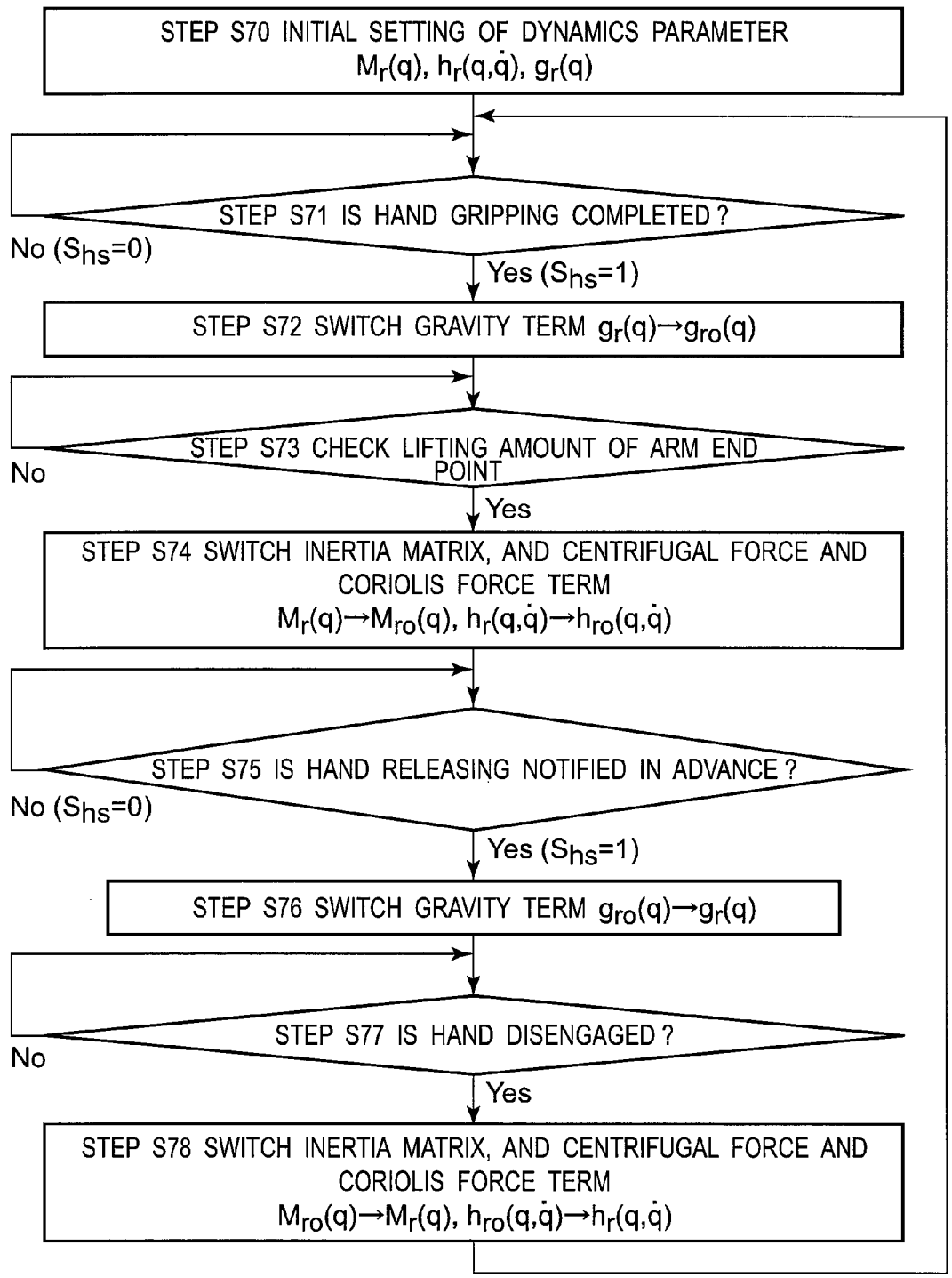
FIG. 7 is a flowchart illustrating operating steps in a dynamics parameter switching unit of the impedance control unit in the robot according to the first embodiment of the present invention.

FIG. 7 is a flowchart showing the operational steps in the dynamics parameter switching unit 50. In the dynamics parameter switching unit 50, the operational steps shown in FIG. 7 are executed independently at the same time as the operational steps shown in FIG. 6.

Step S70 is executed only once at a robot activating time, and the dynamics parameter switching unit 50 sets the dynamics parameters to initial values $$M_r(q), h_r(q,\dot{q}), g_r(q)$$

At next step S71, the dynamics parameter switching unit 50 checks the hand operation state signal $S_{hs}$ from the hand control unit 34. When the hand operation state signal $S_{hs}=0$, the hand operation state signal $S_{hs}$ is continued to be checked, and when the hand operation state signal $S_{hs}=1$, the gripping of the hand is regarded as being completed, and the sequence goes to step S72.

At step S72, the dynamics parameter switching unit 50 switches the gravity term from $g_r(q)$ into $g_{ro}(q)$, so as to output the switched gravity term to the desired torque calculation unit 28.

At next step S73, the dynamics parameter switching unit 50 calculates an amount of lifting from the state of being placed on the first workbench 31 based on the arm endpoint position r, and checks whether the lifting amount has exceeded a constant value, for example, 5 cm. When the dynamics parameter switching unit 50 checks that the lifting amount has not exceeded the constant value, the check is repeated after a predetermined time, and when the dynamics parameter switching unit 50 checks that the lifting amount has exceeded the constant value, the sequence goes to step S74.

At next step S74, the dynamics parameter switching unit 50 switches the inertia matrix from $M_r(q)$ into $M_{ro}(q)$, and switches the centrifugal force and Coriolis force term from $$h_r(q,\dot{q})$$

into $$h_{ro}(q,\dot{q})$$

so as to output the switched inertia matrix and the switched centrifugal force and Coriolis force term to the desired torque calculation unit 28.

At step S75, the dynamics parameter switching unit 50 checks the hand operation state signal $S_{hs}$ from the hand control unit 34 in order to check a notice about the hand releasing. When the hand operation state signal $S_{hs}=0$, the check of the hand operation state signal $S_{hs}$ is continued, and when the hand operation state signal $S_{hs}=1$, it is noticed that the hand is to be released, and the sequence goes to step S76.

At next step S76, the dynamics parameter switching unit 50 switches the gravity term from $g_{ro}(q)$ into $g_r(q)$, and outputs the switched gravity term to the desired torque calculation unit 28, and outputs the dynamics parameter switching completion signal $S_{dp}$ to the hand control unit 34.

At next step S77, the dynamics parameter switching unit 50 calculates a shift amount of the hand 6 in the vertical direction of the screen of the flat type television set 46 with respect to the state that the flat type television set 46 is set on the stand 33 of the second workbench 32, namely, a distance between the hand 6 and the flat type television set 46 based on the arm end point position and orientation vector r. The dynamics parameter switching unit 50 checks whether the distance has exceeded a certain constant value (threshold), for example, 5 cm (whether the hand 6 is disengaged from the flat type television set 46). When the dynamics parameter switching unit 50 checks that the distance has not exceeded the constant value, the check is repeated after a predetermined time, and when the dynamics parameter switching unit 50 checks that the distance has exceeded the constant value, the sequence goes to step S78.

At next step S78, the dynamics parameter switching unit 50 switches the inertia matrix from $M_{ro}(q)$ into $M_r(q)$, and switches the centrifugal force and Coriolis force term from $$h_{ro}(q,\dot{q})$$

into $$h_r(q,\dot{q})$$

so as to output the switched inertia matrix and the switched centrifugal force and Coriolis force term to the desired torque calculation unit 28.

Thereafter, the sequence returns to at step S71, and step S71 to step S78 are repeated.

Figure 8:
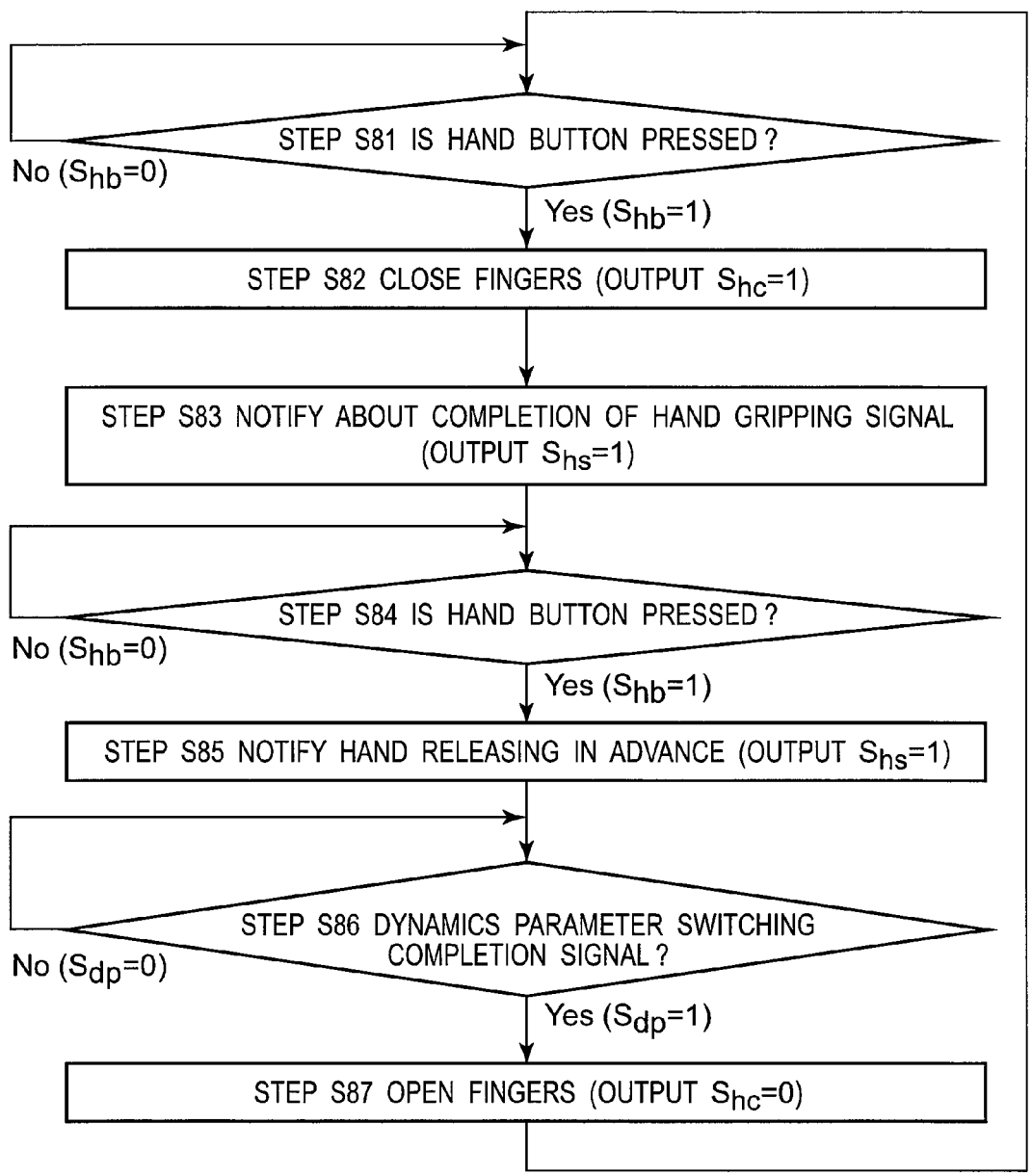
FIG. 8 is a flowchart illustrating operating steps of a hand control unit of the impedance control unit in the robot according to the first embodiment of the present invention.

FIG. 8 is a flowchart showing the operational steps in the hand control unit 34. The hand control unit 34 executes the operational steps shown in FIG. 8 independently at the same time as the operational steps shown in FIG. 6.

At step S81, the hand control unit 34 checks whether the hand button 43 has been pressed based on the signal $S_{hb}$, and when $S_{hb}=0$, namely, the hand control unit 34 checks that the hand button 43 has not been pressed, the check of the signal $S_{hb}$ is repeated after a predetermined time. On the other hand, when $S_{hb}=1$, namely, the hand control unit 34 checks that the hand button 43 has been pressed, the sequence goes to step S82.

At step S82, the hand control signal $S_{hc}=1$ is output from the hand control unit 34 to the robot arm 5, and the motor driving closes between the finger 37a and the finger 37b, and between the finger 37c and the finger 37d (the finger 37e), so that the flat type television set 46 is gripped.

At step S83, the hand control unit 34 outputs a pulse of the hand operation state signal $S_{hs}=1$ notifying about the completion of the hand gripping to the dynamics parameter switching unit 50.

At step S84, the hand control unit 34 checks whether the hand button 43 has been pressed based on the $S_{hb}$, and when $S_{hb}=0$, namely, the hand control unit 34 checks that the hand button 43 has not been pressed, the check of the signal $S_{hb}$ is repeated after a predetermined time. On the other hand, when $S_{hb}=1$, namely, when the hand control unit 34 checks that the hand button 43 has been pressed, the sequence goes to step S85.

At step S85, the hand control unit 34 outputs the pulse of the hand operation state signal $S_{hs}=1$ to the dynamics parameter switching unit 50 in order to give the notice about the execution of the hand releasing.

At step S86, the hand control unit 34 checks whether the dynamics parameter switching unit 50 has output the pulse of the dynamics parameters switching completion signal $S_{dp}=1$ to the hand control unit 34. When the hand control unit 34 checks that the pulse of the dynamics parameters switching completion signal $S_{dp}=1$ has not been output, the check of the dynamics parameters switching completion signal $S_{dp}$ is repeated after a predetermined time. When the hand control unit 34 checks that the pulse of the dynamics parameters switching completion signal $S_{dp}=1$ has been output, the sequence goes to step S87.

At step S87, the hand control unit 34 outputs the hand control signal $S_{hc}=0$ to the robot arm 5, and the motor driving opens between the finger 37a and the finger 37b and between the finger 37c and the finger 37d (the finger 37e), so that the flat type television set 46 is released from the hand 6.

The hand control unit 34 repeats steps S81 to S87, and realizes the gripping and releasing of the flat type television set 46 as one example of a product in cooperation with the dynamics parameter switching unit 50.

According to the first embodiment, the provision of the dynamics parameter switching unit 50 enables separation and independent switching of the inertia matrix, the centrifugal force and Coriolis force term, and the gravity term into the dynamics parameters in the case of only the robot arm 5 and the hand 6 in the state that the robot arm 5 does not grip the object 46 or the dynamics parameters in the case where the object 46 is included as well as the robot arm 5 and the hand 6 in the state that the robot arm 5 grips the object 46. As a result, the directional property of the motions such as the vertical direction and the horizontal direction that is caused by the switching of the dynamics parameters can be controlled.

Therefore, the gripped object-friendly, external environment-friendly, and safe robot 1 can be constituted so that the gripped object 46 does not rub against an external environment and the object 46 or a structure in the external environment is not damaged, dropped, nor tumbled due to an excessive force applied to them.

In the first embodiment, the manipulation is performed by a person by using the impedance control, but the present disclosure is not limited to this. The output from the impedance calculation unit 25 is set to 0, and the desired trajectory generation unit 23 generates a trajectory for doing the task, so that the automatic operation is enabled. Also in this case, the dynamics parameter switching unit 50 produces the similar effect.

Further, in the first embodiment, after the gravity term is switched, the inertia matrix and the centrifugal force and Coriolis force term are switched, but the present disclosure is not limited to this switching pattern. When the hand 6 in FIG. 4(a) is sufficiently close to the gripping position with the hand 6 being made to be close to the flat type television set 46, the inertia matrix and the centrifugal force and Coriolis force term are first switched, respectively, and after the flat type television set 46 is gripped by the hand 6, only the gravity term can be switched.

Further, when the stand 33 in FIG. 4(d) is positioned and the insertion holes 47 are close to right above the stand 33, the inertia matrix and the centrifugal force and Coriolis force term are first switched, respectively, and only the gravity term can be switched after the insertion of the stand 33.

Second Embodiment

Since the basic constitution of the robot 1 according to a second embodiment of the present invention is similar to that in the first embodiment shown in FIGS. 1 and 2, the common portions are denoted by the same numbers as those in the first embodiment, and description thereof is omitted. Only different portions are described in detail below.

Figure 10:
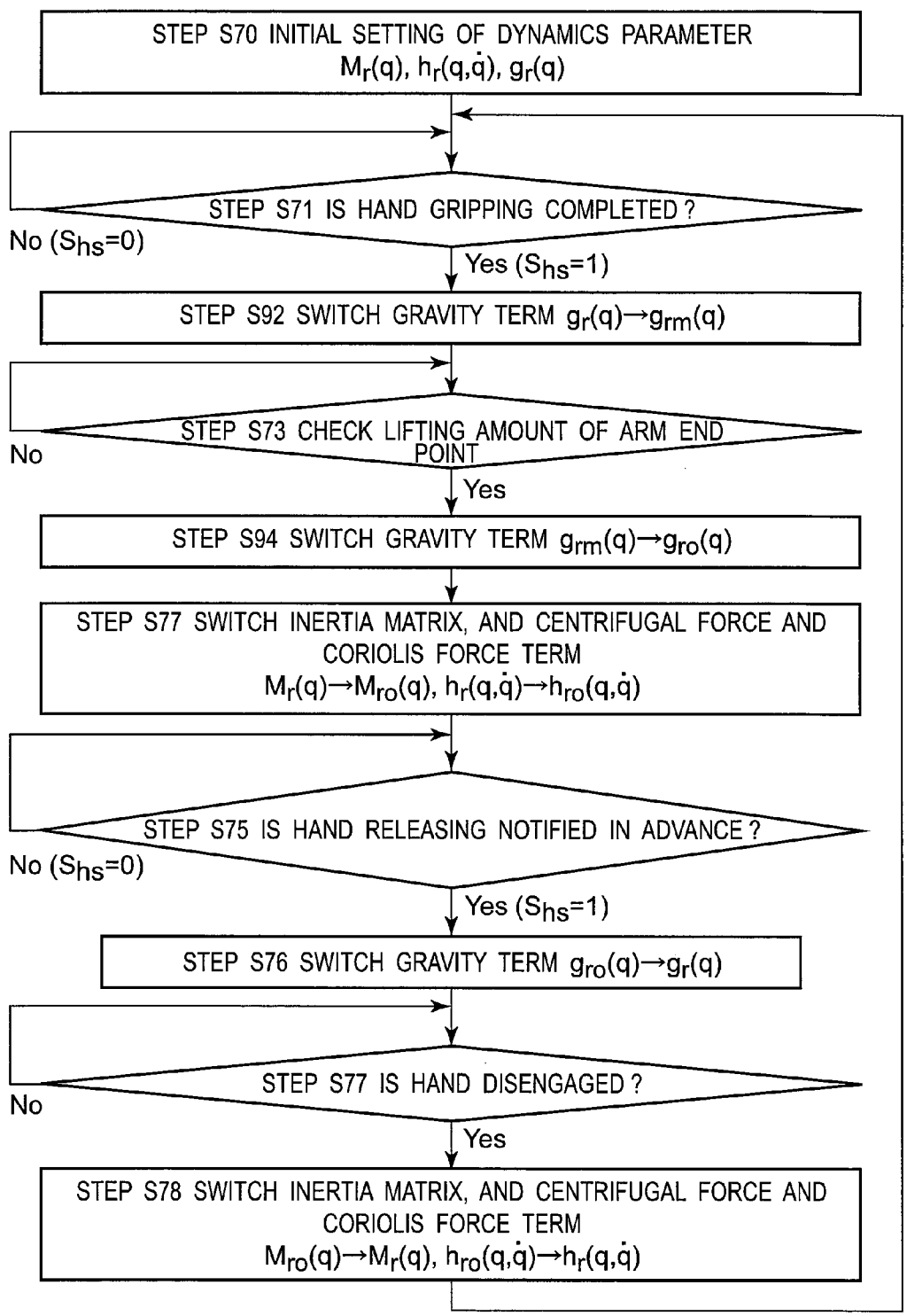
FIG. 10 is a flowchart illustrating operating steps in a dynamics parameter switching unit of an impedance control unit in a robot according to a second embodiment of the present invention.

In the second embodiment, as shown in FIG. 10, the flow of the operational steps in the dynamics parameter switching unit 50 is different, and the dynamics parameters are switched separately at a plurality of stages.

After steps S70 and S71, at step S92, as the first stage of the switching, the dynamics parameter switching unit 50 switches the gravity term from $g_r(q)$ into $g_{rm}(q)$ expressed by the following formula:

$$g_{rm}(q)=\alpha g_{ro}(q)+(1-\alpha)g_r(q). \quad (9)$$

After step S73, at step S94, as the second stage of the switching, the dynamics parameter switching unit 50 switches the gravity term from $g_{rm}(q)$ into $g_{ro}(q)$.

Here, α denotes a constant, and when, for example, α=0.9, control in a case where a weight of a gripped object is 90% of the actual weight is exerted. For this reason, even if the dynamics parameters have an error, the flat type television set 46 as one example of the gripped object is set securely on the first workbench 31. This prevents the flat type television set 46 from being lifted subtly with a part of the flat type television set 46 being set on the first workbench 31, and prevents rubbing between the first workbench 31 and the part of the flat type television set 46 caused by horizontal motion.

In the control where the weight is 90% of the actual weight, the maneuverability in the vertical direction is deteriorated, but the sequence goes to step S94 by the subtly lifting, and thus the effect on the maneuverability is small.

Thereafter, steps S77 and S78 are executed similarly to the first embodiment.

Third Embodiment

Since the basic constitution of the robot 1 according to a third embodiment of the present invention is similar to that in the first embodiment shown in FIGS. 1 and 2, the common portions are denoted by the same numbers as those in the first embodiment, and description thereof is omitted. Only different portions are described in detail below.

Figure 11:
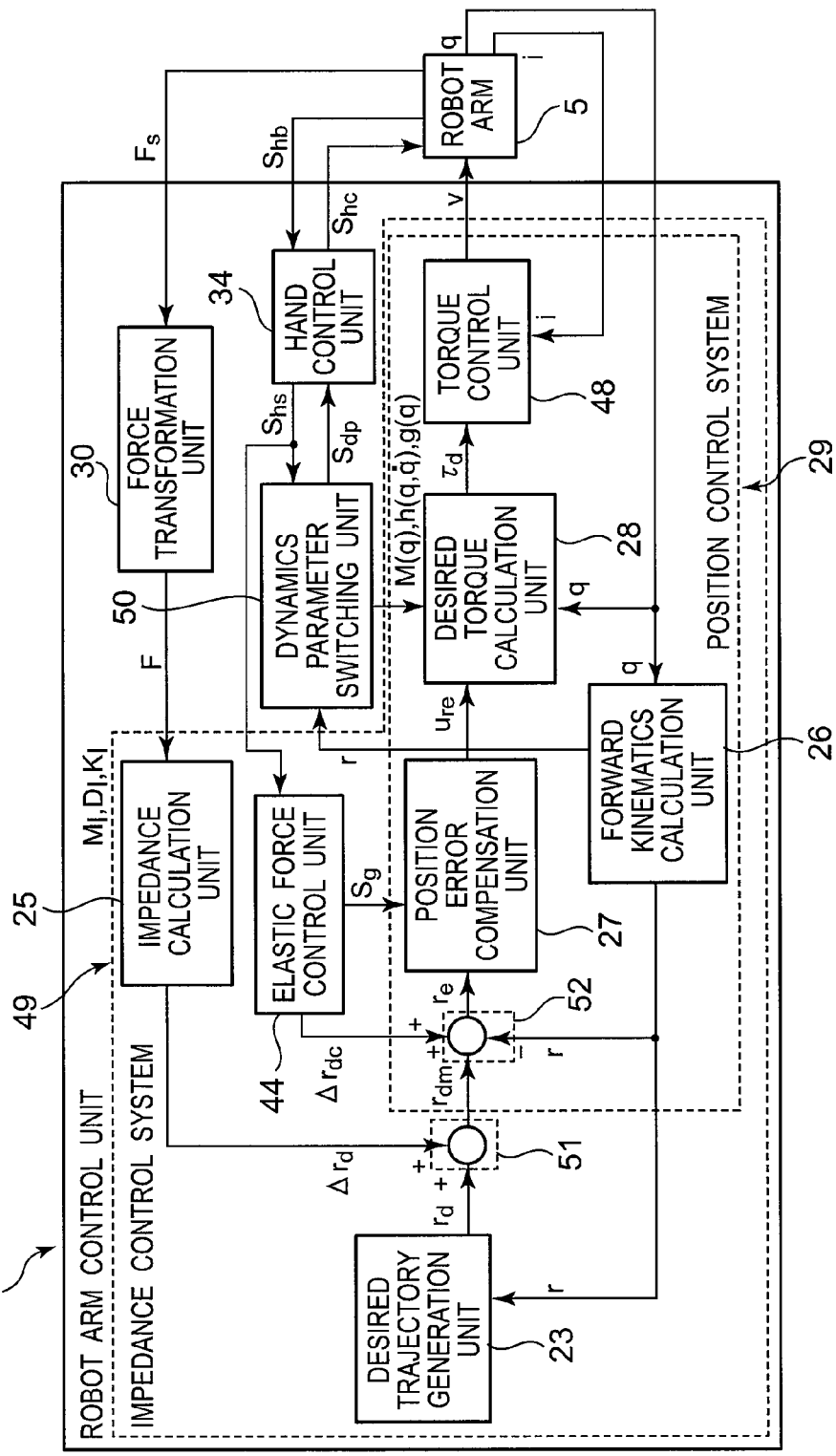
FIG. 11 is a block diagram illustrating a constitution of an impedance control unit of a robot according to a third embodiment of the present invention.

FIG. 11 is a block diagram illustrating a constitution of impedance control unit 4A of the robot according to the third embodiment of the present invention. The impedance control unit 4A according to the third embodiment is different from the impedance control unit 4 of the first embodiment in that an elastic force control unit (elastic force control section) 44 is newly added.

The elastic force control unit 44 receives the hand operation state signal $S_{hs}$ from the hand control unit 34, outputs the desired arm end point position and orientation correction output $\Delta r_{dc}$ to the second calculation section 52, and outputs a gain adjustment signal $S_q$ to the position error compensation unit 27.

Figure 12:
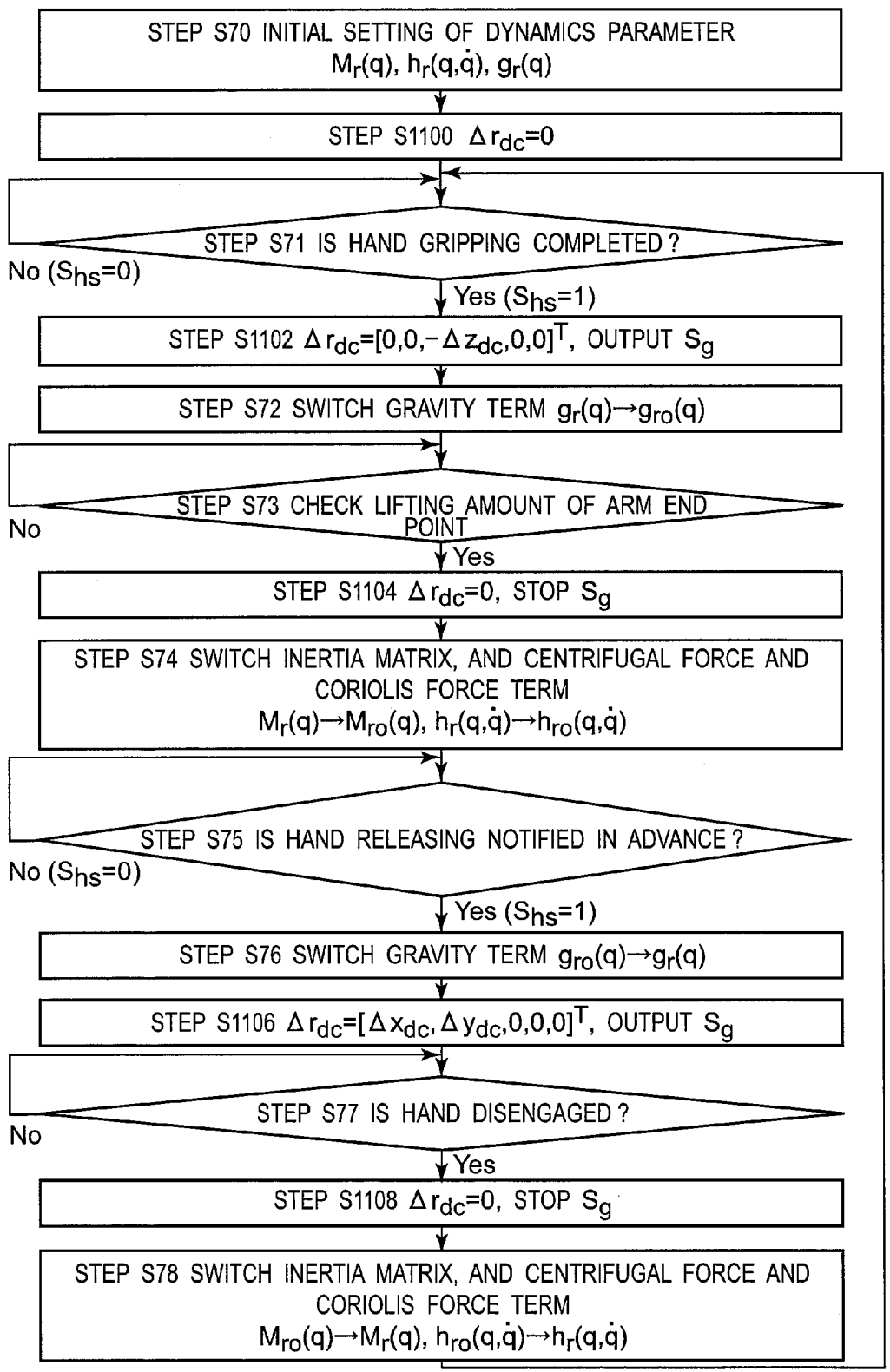
FIG. 12 is a flowchart illustrating operating steps in an elastic force control unit of the impedance control unit in the robot according to the third embodiment of the present invention.

FIG. 12 is a flowchart illustrating the operational steps in the elastic force control unit 44, and FIG. 15 is a view describing the operation timing. The elastic force control unit 44 executes the operational steps shown in FIG. 12 independently at the same time as the operational steps shown in FIG. 6. The operational steps shown in FIG. 12 newly include five operational steps S1100, S1102, S1104, S1106, and S1108 in addition to the operational steps in the first embodiment shown in FIG. 7.

After step S70, at step S1100, in the elastic force control unit 44, the desired arm end point position and orientation correction output $\Delta r_{dc}$ is set to a 0 vector as initial setting.

Next, after step S71, at step S1102, the elastic force control unit 44 sets the desired arm end point position and orientation correction output $\Delta r_d$, so that $\Delta r_{dc}=[0, 0, -\Delta z_{dc}, 0, 0]^T$ and outputs the gain adjustment signal $S_g$ from the elastic force control unit 44 to the position error compensation unit 27. Here, $\Delta z_{dc}$ denotes a positive constant value.

Figure 14A:
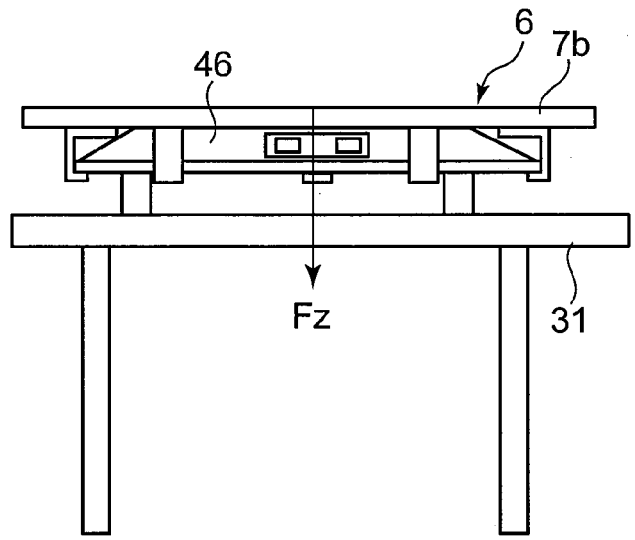
FIG. 14A is a view describing an elastic force according to the third embodiment of the present invention.

When the position error compensation unit 27 receives the gain adjustment signal $S_g$ from the elastic force control unit 44, a gain value of position control is lowered. Therefore, since the arm end point position and orientation desired value are corrected downward in the vertical direction (−z direction) by $-\Delta z_{dc}$, in the state of FIG. 5(b), as shown by an arrow $F_z$ in FIG. 14A, an elastic force for pushing the flat type television set 46 against the first workbench 31 downward in the vertical direction through the hand 6 is applied from the hand 6 to the flat type television set 46. That is to say, the elastic force control unit 44 controls the elastic force applied to the flat type television set 46 as one example of the object from the hand 6, and is constructed so that the elastic force is applied in a direction where the effect of the motion of the hand 6 of the robot arm 5 generated at the time when the dynamics parameter switching unit 50 switches the dynamics parameters is suppressed.

Next, after steps S72 and S73, at step S1104, the elastic force control unit 44 returns the desired arm end point position and orientation correction output $\Delta r_{dc}$ to 0 vector, and the output of the gain adjustment signal $S_g$ from the elastic force control unit 44 to the position error compensation unit 27 is stopped so that the generation of the elastic force is canceled.

Next, after steps S74, S75, and S76, at step S1106, the elastic force control unit 44 sets the desired arm end point position and orientation correction output to $\Delta r_{dc} = [\Delta x_{dc}, \Delta y_{dc}, 0, 0, 0]^T$, and the elastic force control unit 44 outputs the gain adjustment signal $S_g$ to the position error compensation unit 27. Here, $[\Delta x_{dc}, \Delta y_{dc}, 0]^T$ is, in the state of FIG. 5(*e*), a constant vector that directs from the flat type television set 46 towards the hand 6 parallel with a normal direction of the screen of the flat type television set 46.

Figure 14B:
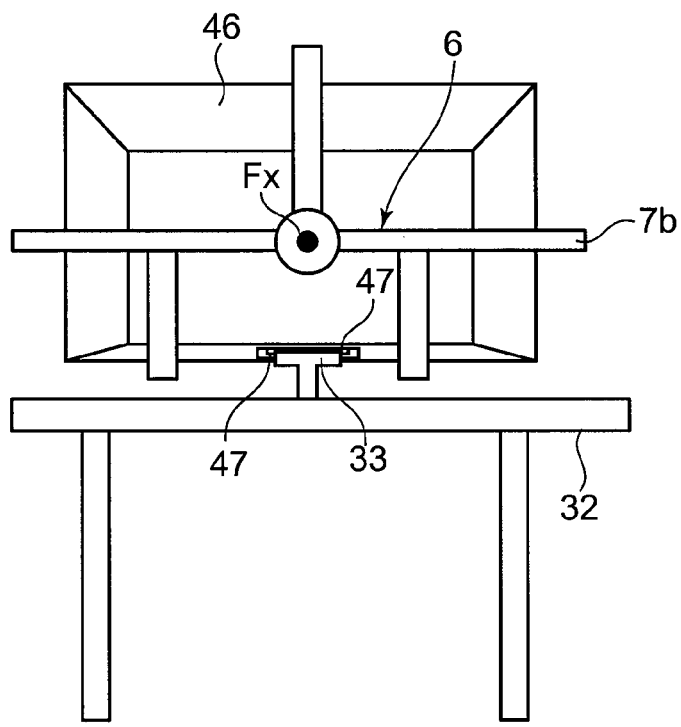
FIG. 14B is a view describing the elastic force according to the third embodiment of the present invention.

When the position error compensation unit 27 receives the gain adjustment signal $S_g$ from the elastic force control unit 44, the position error compensation unit 27 lowers the gain value of the position control. Therefore, since the arm end point position and orientation desired value are corrected in the direction from the flat type television set 46 to the hand 6 by $[\Delta x_{dc}, \Delta y_{dc}, 0]^T$, in the state of FIG. 5 (*e*), the elastic force, which is indicated by an arrow $F_x$ in FIG. 14B (an arrow in the direction piercing from a back side to a front side on the paper surface in FIG. 14B), acts so that the hand 6 is disengaged from the flat type television set 46. That is to say, the elastic force control unit 44 exerts control so that after the flat type television set 46 is set as one example of the object gripped by the hand 6, the elastic force in a direction for releasing the restraint of the hand 6 is applied before the dynamics parameter of the inertia force term component is switched.

Next, after step S77, at step S1108, the elastic force control unit 44 returns the desired arm endpoint position and orientation correction output $\Delta r_{dc}$ to 0 vector, and stops the output of the gain adjustment signal $S_g$ from the elastic force control unit 44 to the position error compensation unit 27, so as to cancel the generation of the elastic force.

Thereafter, after step S78, the sequence returns to step S71, and steps S71 to S78 are repeated.

According to the operation of the elastic force control unit 44, in the state of FIG. 5(*b*), the elastic force for pushing downward in the vertical direction acts, so that the flat type television set 46 is securely fixed to the first workbench 31. For this reason, the flat type television set 46 is halfway lifted by the switching of the dynamics parameters so as to easily move in the horizontal direction, and LULLS a possibility that the flat type television set 46 rubs against the first workbench 31 due to the manipulation performed by a person can be reduced. Further, in the state of FIG. 5(*e*), since the elastic force for disengaging the hand 6 from the flat type television set 46 is exerted, the operation for separating the hand 6 from the flat type television set 46 is facilitated also by the elastic force at a time when the hand 6 is released. This ensures the disengagement.

In the first to third embodiments, the joints of the robot arm 5 are driven by the motors, but the present disclosure is not limited to this, and the similar effect can be produced by a pneumatic actuator such as a pneumatic cylinder or a pneumatic artificial muscle, in other words, an elastic body actuator. Particularly in the third embodiment, since the use of the pneumatic actuator enables the use of a mechanistic elastic force, the effect can be enhanced.

Further, in the first embodiment, the inertia matrix and the centrifugal force and Coriolis force term are switched in the states of FIG. 5(*c*) and FIG. 5(*f*), but the present disclosure is not limited to this. For example, when the hand 6 is in a low-speed state just before the hand 6 contacts with the flat type television set 46 and stops in order to grip the flat type television set 46 in FIG. 5(*a*), and in a low-speed state just before the positioning of the flat type television set 46 with respect to the stand 33 is completed and the inserting operation just starts in FIG. 5(*d*), the similar effect is produced even in the case where the inertia matrix and the centrifugal force and Coriolis force term are switched. In this case, since the hand 6 is in the non-restrained state just before the restrained state, a problem such that the flat type television set 46 rubs against the first workbench 31 and the surface of the flat type television set 46 is damaged does not arise. Further, the operation is performed with the object not being gripped, by using the dynamics parameters in the state that an object is gripped, and thus the maneuverability is deteriorated. However, since the speed is sufficiently low, the effect is small.

Figure 13:
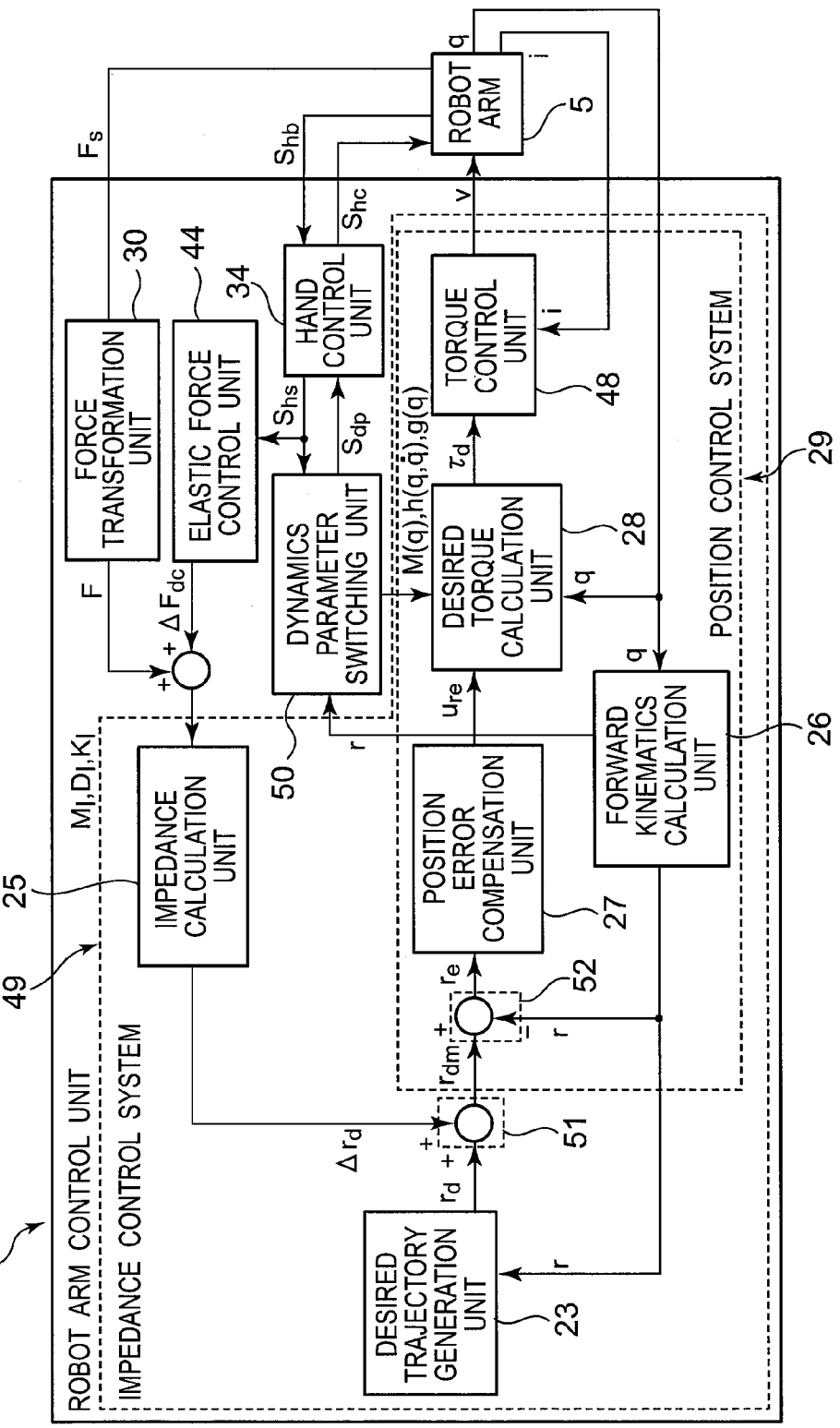
FIG. 13 is a block diagram illustrating another constitution of the impedance control unit in the robot according to the third embodiment of the present invention.

Further, in the third embodiment, the elastic force control unit 44, as shown in FIG. 11, outputs the desired arm end point position and orientation correction output $\Delta r_d$, and adjusts the gain of the position error compensation unit 27, but the constitution is not limited to this. For example, the elastic force control unit 44, as shown in FIG. 13, outputs $\Delta F_{dc}$, and corrects a force input into the impedance calculation unit 25 so as to generate the elastic force. In this case, at step S1102 in FIG. 12, $\Delta F_{dc} = [0, 0, -\Delta F z_{dc}, 0, 0]^T$ (here, $\Delta F z_{dc}$ denotes a positive constant value) may be output, and at step S6, when $\Delta F_{dc} = [\Delta F x_{dc}, \Delta F y_{dc}, 0, 0, 0]^T$ (here, $[\Delta F x_{dc}, \Delta F y_{dc}, 0]^T$, in the state of FIG. 5(*e*), denotes a constant vector directing from the flat type television set 46 towards the hand 6 parallel with the normal direction of the screen of the flat type television set 46), the similar effect can be produced.

Though the present disclosure has been described above based on the above first to third embodiments, the present disclosure should not be limited to the above-described first to third embodiments. For example, the present disclosure also includes the following cases.

Part or entirety of each of the above-described control devices is actually a computer system that includes, for example, a microprocessor, ROM, RAM, hard disk unit, display unit, keyboard, mouse, and the like. A computer program is stored on the RAM or the hard disk unit. Functions of each unit (section) of the control devices can be achieved by the microprocessor operating according to the computer program. The computer program mentioned here is a combination of a plurality of instruction codes that indicate commands to a computer for achieving predetermined functions.

For example, each component (unit/section) can be implemented as a result that a program executing section (part/unit) such as a CPU reads and executes software programs recorded in a recording medium such as a hard disk or semiconductor memory. Here, software that implements a part or entirety of the control devices according to each of the above-mentioned embodiments or modifications is a following program. That is to say, this program has a computer execute the sections (parts/units) defined in claims. The program has a computer execute the units/steps defined in claims. That is, such a program is a control program of a robot having joints for allowing a computer to execute:

a function of a position information acquiring section that acquires time series information about a position of the robot, speed information thereof, or acceleration information thereof;

a function of a dynamics parameter switching section that switches a gravity term component and an inertia force term component of a motion equation separately between a plurality of dynamics parameters having the dynamics parameter of the robot in a state where the robot does not grip an object and the dynamics parameter including the object gripped by the robot in a state where the robot arm grips the object;

a function of a desired torque calculation section that outputs a desired value of a joint torque of the robot as a desired joint torque based on the motion equation after the dynamics parameter switching section switches the dynamics parameters and the time series information about the position of the robot, the speed information thereof, or the acceleration information thereof acquired by the position information acquiring section; and a function for controlling an operation of the robot based on an output from the desired torque calculation section.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

The robot, the robot control device, the robot control method, and the robot control program of the present disclosure are useful as a robot, a robot control device, a robot control method, and a robot control program that can control the directional property of the motions in the vertical direction and the horizontal direction caused by the switching of the dynamics parameters, and control the operation for conveying an object.

The entire disclosure of Japanese Patent Application No. 2011-246217 filed on Nov. 10, 2011, including specification, claims, drawings, and summary are incorporated herein by reference in its entirety.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A robot, comprising:
a robot arm that has joints and handles an object; and
a control device that controls an operation of the robot arm, the control device comprising:
a position information acquiring section that acquires time series information about a position of the robot arm;
a dynamics parameter switching section that separates a gravity term component and an inertia force term component of a motion equation from each other and switches the gravity term component and the inertia force term component of the motion equation separately before or after a timing of switching from a restrained state that an arm end point of the robot arm is restrained due to a contact with external environment to a non-restrained state and before or after a timing of switching from the non-restrained state to the restrained state, between a plurality of dynamics parameters having the dynamics parameter of the robot arm in a state where the robot arm does not grip an object and the dynamics parameter including the object gripped by the robot arm in a state where the robot arm grips the object; and a desired torque calculation section that outputs a desired value of a joint torque of the robot arm as a desired joint torque based on the motion equation after the dynamics parameter switching section switches the dynamics parameters and the time series information about the position of the robot arm acquired by the position information acquiring section, wherein the control device controls the operation of the robot arm based on an output from the desired torque calculation section.

2. The robot according to claim 1, wherein the dynamics parameter switching section switches the gravity term component and the inertia force term component of the motion equation for the robot arm and the object gripped by the robot arm separately in the plurality of dynamics parameters based on a switching signal of an object gripping task and an object gripping releasing task according to a timing of switching between the restrained state at a time when the arm end point of the robot arm grips the object and in a non-restrained state.

3. The robot according to claim 2, wherein the dynamics parameter switching section switches only the dynamics parameter of the inertia force term component when the arm end point of the robot arm is in the non-restrained state based on the time series information about the position of the robot arm acquired by the position information acquiring section.

4. The robot according to claim 3, wherein the dynamics parameter switching section switches only the dynamics parameter of the inertia force term component when the arm end point of the robot arm grips the object, and after the gripped object is set, the gripping is released, and the arm end point of the robot arm is in the non-restrained state.

5. The robot according to claim 1, wherein the dynamics parameter switching section switches only the dynamics parameter of the inertia force term component when an operation speed is lower than that at a conveying time so that positioning for the gripping or the setting is performed when the robot arm grips the object, conveys the object, and sets the gripped object.

6. The robot according to claim 1, wherein the dynamics parameter switching section switches the dynamics parameter of the gravity term component separately at a plurality of stages.

7. The robot according to claim 1, wherein the dynamics parameter switching section switches a dynamics parameter of a centrifugal force and Coriolis force term of the motion equation as well as the inertia force term component when the dynamics parameter of the inertia force term component is switched.

8. The robot according to claim 1,
wherein the robot arm is driven by an elastic body actuator, and
the robot arm further comprises:
an elastic force control section that controls an elastic force of the arm end point of the robot arm generated by the elastic body actuator of the robot,
wherein the elastic force control section applies an elastic force in a direction where an effect of a motion of the arm end point of the robot arm generated at a time of switching the dynamics parameters by the dynamics parameter switching section is suppressed.

9. The robot according to claim 8, further comprising:
the robot arm driven by the elastic body actuator; and
the elastic force control section that controls the elastic force of the arm end point of the robot arm generated by the elastic body actuator of the robot arm,
wherein the elastic force control section controls to apply an elastic force in a direction where restraint of the arm end point is canceled before the dynamics parameter of the inertia force term component is switched after the object gripped by the arm end point is set.

10. A control device of a robot having joints, comprising:
a position information acquiring section that acquires time series information about a position of the robot;
a dynamics parameter switching section that separates a gravity term component and an inertia force term component of a motion equation from each other and switches the gravity term component and the inertia force term component of the motion equation separately before or after a timing of switching from a restrained state that an arm end point of the robot is restrained due to a contact with external environment to a non-restrained state and before or after a timing of switching from the non-restrained state to the restrained state, between a plurality of dynamics parameters having the dynamics parameter of the robot in a state where the robot does not grip an object and the dynamics parameter including the object gripped by the robot in a state where the robot grips the object; and
a desired torque calculation section that outputs a desired value of a joint torque of the robot as a desired joint torque based on the motion equation after the dynamics parameter switching section switches the dynamics parameters and the time series information about the position of the robot acquired by the position information acquiring section,
wherein an operation of the robot is controlled based on an output from the desired torque calculation section.

11. A control method of a robot having joints, comprising:
acquiring time series information about a position of the robot by a position information acquiring section;
separating a gravity term component and an inertia force term component of a motion equation from each other and switching the gravity term component and the inertia force term component of the motion equation separately before or after a timing of switching from a restrained state that an arm end point of the robot is restrained due to a contact with external environment to a non-restrained state and before or after a timing of switching from the non-restrained state to the restrained state, between a plurality of dynamics parameters having the dynamics parameter of the robot in a state where the robot does not grip an object and the dynamics parameter including the object gripped by the robot in a state where the robot grips the object, by a dynamics parameter switching section;
outputting a desired value of a joint torque of the robot as a desired joint torque by a desired torque calculation section based on the motion equation after the dynamics parameter switching section switches the dynamics parameters and the time series information about the position of the robot acquired by the position information acquiring section; and
controlling an operation of the robot based on an output from the desired torque calculation section.

12. A non-transitory computer-readable recording medium including a control program of a robot having joints for allowing a computer to execute:
a function of a position information acquiring section that acquires time series information about a position of the robot;
a function of a dynamics parameter switching section that separates a gravity term component and an inertia force term component of a motion equation from each other and switches the gravity term component and the inertia force term component of the motion equation separately before or after a timing of switching from a restrained state that an arm end point of the robot is restrained due to a contact with external environment to a non-restrained state and before or after a timing of switching from the non-restrained state to the restrained state, between a plurality of dynamics parameters having the dynamics parameter of the robot in a state where the robot does not grip an object and the dynamics parameter including the object gripped by the robot in a state where the robot grips the object;
a function of a desired torque calculation section that outputs a desired value of a joint torque of the robot as a desired joint torque based on the motion equation after the dynamics parameter switching section switches the dynamics parameters and the time series information about the position of the robot acquired by the position information acquiring section; and
a function for controlling an operation of the robot based on an output from the desired torque calculation section.

* * * * *